United States Patent
Qin et al.

(10) Patent No.: US 10,778,393 B2
(45) Date of Patent: Sep. 15, 2020

(54) REFERENCE SIGNAL TRANSMISSION METHOD, AND APPARATUS

(71) Applicant: HUAWEI TECHNOLOGIES CO., LTD., Shenzhen, Guangdong (CN)

(72) Inventors: Yi Qin, Kista (SE); Hua Li, Shanghai (CN); Zhongfeng Li, Munich (DE)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/428,467

(22) Filed: May 31, 2019

(65) Prior Publication Data
US 2019/0296875 A1 Sep. 26, 2019

Related U.S. Application Data

(63) Continuation of application No. PCT/CN2018/071617, filed on Jan. 5, 2018.

(30) Foreign Application Priority Data

Jan. 6, 2017 (CN) .......................... 2017 1 0011019

(51) Int. Cl.
*G06F 11/00* (2006.01)
*H04L 5/00* (2006.01)
*H04B 17/318* (2015.01)

(52) U.S. Cl.
CPC ......... *H04L 5/0048* (2013.01); *H04B 17/318* (2015.01); *H04L 5/00* (2013.01)

(58) Field of Classification Search
CPC ............................. H04L 5/0048; H04B 17/318
(Continued)

(56) References Cited

U.S. PATENT DOCUMENTS

2014/0286182 A1* 9/2014 Chen ..................... H04L 1/0026
370/252
2015/0092768 A1* 4/2015 Ng ....................... H04J 11/0069
370/350
(Continued)

FOREIGN PATENT DOCUMENTS

CN 105025519 A 11/2015
CN 105122869 A 12/2015
(Continued)

OTHER PUBLICATIONS

R1-1611236—Huawei, HiSilicon, "Independent and Joint Control of CSI-RS Transmission and CSI reporting for NR MIMO," 3GPP TSG RAN WG1 Meeting #87, Reno, USA, Nov. 14-18, 2016, 5 pages.
(Continued)

*Primary Examiner* — Chuong T Ho
(74) *Attorney, Agent, or Firm* — Fish & Richardson P.C.

(57) ABSTRACT

This application discloses a reference signal transmission method and an apparatus. A network node sends reference signals by mapping the reference signals to at least one resource unit, where the at least one resource unit includes a plurality of sub-resource units; and the network node receives, from the terminal, measurement information related to part of the plurality of sub-resource units. The terminal selects, based on configuration information of the reference signals, part of the measurement information to report, so that a quantity of channel resources occupied by the measurement information is reduced.

12 Claims, 9 Drawing Sheets

(58) Field of Classification Search
USPC .................................................. 370/252, 254
See application file for complete search history.

(56) References Cited

U.S. PATENT DOCUMENTS

| | | | |
|---|---|---|---|
| 2015/0341099 A1 | 11/2015 | Kang et al. | |
| 2016/0174093 A1* | 6/2016 | Zhou | H04L 5/0057 370/252 |
| 2016/0226640 A1* | 8/2016 | Seol | H04B 7/0695 |
| 2017/0006525 A1 | 1/2017 | Ruiz Delgado et al. | |
| 2018/0007574 A1* | 1/2018 | Park | H04W 72/042 |
| 2018/0034525 A1* | 2/2018 | Park | H04B 7/0626 |
| 2018/0083680 A1* | 3/2018 | Guo | H04B 7/0626 |
| 2018/0102817 A1* | 4/2018 | Park | H04L 5/001 |
| 2018/0102822 A1* | 4/2018 | Noh | H04B 7/0417 |
| 2018/0115357 A1* | 4/2018 | Park | H04B 7/0456 |
| 2018/0212800 A1* | 7/2018 | Park | H04L 5/0057 |
| 2018/0309556 A1* | 10/2018 | Chen | H04W 72/04 |
| 2019/0007897 A1* | 1/2019 | Ng | H04J 11/0069 |
| 2019/0058558 A1* | 2/2019 | Lee | H04B 7/088 |
| 2019/0158239 A1* | 5/2019 | Chen | H04L 1/0026 |

FOREIGN PATENT DOCUMENTS

| | | |
|---|---|---|
| CN | 105981421 A | 9/2016 |
| EP | 3471315 A1 | 4/2019 |
| WO | 2016122232 A1 | 8/2016 |

OTHER PUBLICATIONS

R1-1611986—Intel Corporation, "Reference Signal and Procedure for Beam Management P-2 and P-3," 3GPP TSG-RAN WG1 #87, Reno, USA, Nov. 14-18, 2016, 3 pages.
R1-1611242—Huawei, HiSilicon, "DL RS Design for NR Beam Management," 3GPP TSG RAN WG1 Meeting #87, Reno, NV, USA, Nov. 14-18, 2016, 5 pages.
R1-1612864—Nokia et al., "Beam Management—Beam Reporting," 3GPP TSG-RAN WG1#87, Reno, U.S.A., Nov. 14-18, 2016, 3 pages.
R1-1701552—MCC Support, "Final Report of 3GPP TSG RAN WG1 #87 v1.0.0; (Reno, USA, Nov. 14-18, 2016)," 3GPP TSG RAN WG1 Meeting #88, Athens, Greece, Feb. 13-17, 2017, 157 pages.
R1-1613175—Samsung et al., "WF on CSI Framework for NR," 3GPP TSG RAN WG1 Meeting #86bis, Reno, USA Nov. 14-18, 2016, 6 pages.
R1-1613669—Samsung et al., "WF on CSI-RS for beam management," 3GPP TSG RAN WG1 Meeting #87, Reno, USA, Nov. 14-18, 2016, 5 pages.
R1-1700069—Huawei et al., "CSI-RS design for beam management," 3GPP TSG RAN WG1 NR Ad-Hoc Meeting, Spokane, USA, Jan. 16-20, 2017, 7 pages.
R1-1701694—Huawei et al., "CSI-RS design for beam management," 3GPP TSG RAN WG1 Meeting #88, Athens, Greece, Feb. 13-17, 2017, 8 pages.
R1-1704235—Huawei et al., "CSI-RS design for beam management," 3GPP TSG RAN WG1 Meeting #88bis, Spokane, USA, Apr. 3-7, 2017, 9 pages.
R1-1706931—Huawei et al., "CSI-RS design for beam management," 3GPP TSG RAN WG1 Meeting #89, Hangzhou, China, May 15-19, 2017, 10 pages.
R1-1715440—Zte et al., "Discussion on beam management," 3GPP TSG RAN WG1 Meeting NR#3, Nagoya, Japan, Sep. 18-21, 2017, 11 pages.
R1-1717424—Zte et al., "Discussion on beam management," 3GPP TSG RAN WG1 Meeting #90-bis, Prague, Czechia, Oct. 9-13, 2017, 12 pages.
PCT International Search Report and Written Opinion issued in International Application No. PCT/CN2018/071617 dated Apr. 3, 2018, 11 pages (partial English translation).
Extended European Search Report issued in European Application No. 18735995.5 dated Dec. 4, 2019, 11 pages.
NTT Docomo, Inc., "Status Report to TSG," 3GPP TSG RAN meeting #74, RP-162201, Vienna, Austria, Dec. 5-8, 2016, total 148 pages.

* cited by examiner

REFERENCE SIGNAL TRANSMISSION METHOD, AND APPARATUS

CROSS-REFERENCE TO RELATED APPLICATIONS

This application is a continuation of International Application No. PCT/CN2018/071617, filed on Jan. 5, 2018, which claims priority to Chinese Patent Application No. 201710011019.X, filed on Jan. 6, 2017, The disclosures of the aforementioned applications are hereby incorporated by reference in their entireties.

TECHNICAL FIELD

This application relates to the field of mobile communications technologies, and in particular, to a reference signal transmission method and an apparatus.

BACKGROUND

With development of mobile communications technologies, requirements for a communication rate and a capacity are continuously increasing. The 3rd Generation Partnership Project 3GPP takes a high frequency band into consideration in system design in a next generation evolved radio system (NR). On the high frequency band, coverage may be enhanced by using a beamforming technology. A base station and a terminal may communicate with each other by using a plurality of beams. For downlink transmission, to determine an optimal transmitting beam on a base station side and an optimal receiving beam on a terminal side, the base station needs to send channel state information-reference signals (CSI-RS) on a plurality of beams. The terminal uses a plurality of beams to receive the reference signals, and reports measurement information after separately obtaining reference signal received powers (RSRP) or signal to interference plus noise ratios (SINR) through measurement. The base station determines an optimal beam.

The foregoing measurement information reporting solution needs to be optimized.

SUMMARY

This application provides a reference signal transmission method and an apparatus, to reduce a quantity of channel resources occupied by reported measurement information.

According to a first aspect, a reference signal transmission method is provided, including:

sending, by a network node, reference signals by mapping the reference signals to at least one resource unit, wherein the at least one resource unit comprises a plurality of sub-resource units; and receiving, by the network node from the terminal, measurement information related to part of the plurality of sub-resource units.

With reference to the first aspect, in a first possible implementation, the method further includes:

sending, by the network node, configuration information of the reference signals to the terminal.

With reference to the first possible implementation of the first aspect, in a second possible implementation, the configuration information of the reference signals comprises at least one of the following information: a resource unit type, a resource unit size, a resource unit quantity, and a resource unit sequence.

With reference to the second possible implementation of the first aspect, in a third possible implementation, the resource unit type indicates whether the reference signals mapped by the network node to the plurality of sub-resource units of the at least one resource unit have a same reference signal characteristic or an associated reference signal characteristic.

With reference to the second or the third possible implementation of the first aspect, in a fourth possible implementation, when the resource unit quantity is 1, and the resource unit type indicates that the reference signals mapped by the network node to the plurality of sub-resource units of the one resource unit have different reference signal characteristics or unassociated reference signal characteristics, the measurement information related to the part of the plurality of sub-resource units comprises an index of the part of the plurality of sub-resource units and an measurement value of the reference signal corresponding to the part of the plurality of sub-resource units.

With reference to the second or the third possible implementation of the first aspect, in a fifth possible implementation, when the resource unit quantity is greater than or equal to 2, and the resource unit type indicates that the reference signals mapped by the network node to a plurality of sub-resource units of one of the at least one resource units have different reference signal characteristics or unassociated reference signal characteristics, the measurement information related to the part of the plurality of sub-resource units comprises an index of the part of the plurality of sub-resource units and a measurement value of the reference signal corresponding to the part of the plurality of sub-resource units.

With reference to the second or the third possible implementation of the first aspect, in a sixth possible implementation, when the resource unit quantity is 1, and the resource unit type indicates that the reference signals mapped by the network node to the plurality of sub-resource units of the one resource unit have a same reference signal characteristic or an associated reference signal characteristic, the measurement information related to the part of the plurality of sub-resource units comprises a measurement value of the reference signal corresponding to the part of the plurality of sub-resource units.

With reference to the second or the third possible implementation of the first aspect, in a seventh possible implementation, when the resource unit quantity is greater than or equal to 2, and the resource unit type indicates that the reference signals mapped by the network node to a plurality of sub-resource units of one of the at least one resource unit have a same reference signal characteristic or an associated reference signal characteristic, the measurement information related to the part of the plurality of sub-resource units comprises an index of the part of the plurality of resource units and a measurement value of the reference signal corresponding to the part of the plurality of resource units.

With reference to the second or the third possible implementation of the first aspect, in an eighth possible implementation, when the resource unit quantity is greater than or equal to 2, and the resource unit type indicates that the reference signals mapped by the network node to a plurality of sub-resource units of a first one of the at least one resource unit have a same reference signal characteristic or an associated reference signal characteristic, and that the reference signals mapped by the network node to a plurality of sub-resource units of a second one of the at least one resource unit have different reference signal characteristics or unassociated reference signal characteristics, the measurement information related to the part of the plurality of sub-resource units comprises an index of part of sub-resource units of the second one of the at least one resource unit and a measurement value of the reference signal corresponding to the part of sub-resource units.

With reference to any one of the third to the eighth possible implementations of the first aspect, in a ninth possible implementation, the same reference signal characteristic includes at least one of the following characteristics: a same transmitting beam, a same precoding, a same beam identifier, a same precoding identifier, a same angle of departure, and a same antenna port; and the associated reference signal characteristic includes a quasi co-location QCL relationship.

With reference to any one of the foregoing possible implementations, in a tenth possible implementation, the measurement information includes at least one of the following information: a resource unit index, a sub-resource unit index, and a measurement value.

With reference to the tenth possible implementation of the first aspect, in an eleventh possible implementation, the measurement value includes at least one of the following information: a reference signal received power RSRP, an RSRP quantized value, a channel quality indicator CQI, a signal to interference plus noise ratio SINR, an SINR quantized value, a precoding matrix indication PMI, and a rank indication RI.

According to a second aspect, a reference signal transmission method is provided, including:

receiving, by a terminal, configuration information of reference signals from a network node;

receiving and measuring, by the terminal based on the configuration information, the reference signals mapped to at least one resource unit, wherein the at least one resource unit comprises a plurality of sub-resource units; and sending, by the terminal to the network node, measurement information related to part of the plurality of sub-resource units.

With reference to the second aspect, in a first possible implementation, the configuration information of the reference signals comprises at least one of the following information: a resource unit type, a resource unit size, a resource unit quantity, and a resource unit sequence.

With reference to the first possible implementation of the second aspect, in a second possible implementation, the resource unit type indicates whether the reference signals mapped by the network node to the plurality of sub-resource units of the at least one resource unit have a same reference signal characteristic or an associated reference signal characteristic.

With reference to the first or the second possible implementation of the second aspect, in a third possible implementation, when the resource unit quantity is 1, and the resource unit type indicates that the reference signals mapped by the network node to the plurality of sub-resource units of the one resource unit have different reference signal characteristics or unassociated reference signal characteristics, the measurement information related to the part of the plurality of sub-resource units comprises an index of the part of the plurality of sub-resource units and an measurement value of the reference signal corresponding to the part of the plurality of sub-resource units.

With reference to the first or the second possible implementation of the second aspect, in a fourth possible implementation, when the resource unit quantity is greater than or equal to 2, and the resource unit type indicates that the reference signals mapped by the network node to a plurality of sub-resource units of one of the at least one resource units have different reference signal characteristics or unassociated reference signal characteristics, the measurement information related to the part of the plurality of sub-resource units comprises an index of the part of the plurality of sub-resource units and a measurement value of the reference signal corresponding to the part of the plurality of sub-resource units.

With reference to the first or the second possible implementation of the second aspect, in a fifth possible implementation, when the resource unit quantity is 1, and the resource unit type indicates that the reference signals mapped by the network node to the plurality of sub-resource units of the one resource unit have a same reference signal characteristic or an associated reference signal characteristic, the measurement information related to the part of the plurality of sub-resource units comprises a measurement value of the reference signal corresponding to the part of the plurality of sub-resource units.

With reference to the first or the second possible implementation of the second aspect, in a sixth possible implementation, when the resource unit quantity is greater than or equal to 2, and the resource unit type indicates that the reference signals mapped by the network node to a plurality of sub-resource units of one of the at least one resource unit have a same reference signal characteristic or an associated reference signal characteristic, the measurement information related to the part of the plurality of sub-resource units comprises an index of the part of the plurality of resource units and a measurement value of the reference signal corresponding to the part of the plurality of resource units.

With reference to the first or the second possible implementation of the second aspect, in a seventh possible implementation, when the resource unit quantity is greater than or equal to 2, and the resource unit type indicates that the reference signals mapped by the network node to a plurality of sub-resource units of a first one of the at least one resource unit have a same reference signal characteristic or an associated reference signal characteristic, and that the reference signals mapped by the network node to a plurality of sub-resource units of a second one of the at least one resource unit have different reference signal characteristics or unassociated reference signal characteristics, the measurement information related to the part of the plurality of sub-resource units comprises an index of part of sub-resource units of the second one of the at least one resource unit and a measurement value of the reference signal corresponding to the part of sub-resource units.

With reference to any one of the second to the seventh possible implementations of the second aspect, in an eighth possible implementation, the same reference signal characteristic includes at least one of the following characteristics: a same transmitting beam, a same precoding, a same beam identifier, a same precoding identifier, a same angle of departure, and a same antenna port; and the associated reference signal characteristic includes a quasi co-location QCL relationship.

With reference to any one of the foregoing possible implementations, in a ninth possible implementation, the measurement information includes at least one of the following information: a resource unit index, a sub-resource unit index, and a measurement value.

With reference to the ninth possible implementation of the second aspect, in a tenth possible implementation, the measurement value includes at least one of the following information: a reference signal received power RSRP, an RSRP quantized value, a channel quality indicator CQI, a signal to interference plus noise ratio SINR, an SINR quantized value, a precoding matrix indication PMI, and a rank indication RI.

According to a third aspect, a network node is provided, including:

a processor, configured to map reference signals to at least one resource unit, wherein the at least one resource unit comprises a plurality of sub-resource units; and a transceiver, configured to: send the reference signals, and receive, from the terminal, measurement information related to part of the plurality of sub-resource units.

With reference to the third aspect, in a first possible implementation, the transceiver is further configured to send configuration information of the reference signals to the terminal.

With reference to the first possible implementation of the third aspect, in a second possible implementation, the configuration information of the reference signals comprises at least one of the following information: a resource unit type, a resource unit size, a resource unit quantity, and a resource unit sequence.

With reference to the second possible implementation of the third aspect, in a third possible implementation, the resource unit type indicates whether the reference signals mapped by the network node to the plurality of sub-resource units of the at least one resource unit have a same reference signal characteristic or an associated reference signal characteristic.

With reference to the second or the third possible implementation of the third aspect, in a fourth possible implementation, when the resource unit quantity is 1, and the resource unit type indicates that the reference signals mapped by the network node to the plurality of sub-resource units of the one resource unit have different reference signal characteristics or unassociated reference signal characteristics, the measurement information related to the part of the plurality of sub-resource units comprises an index of the part of the plurality of sub-resource units and an measurement value of the reference signal corresponding to the part of the plurality of sub-resource units.

With reference to the second or the third possible implementation of the third aspect, in a fifth possible implementation, when the resource unit quantity is greater than or equal to 2, and the resource unit type indicates that the reference signals mapped by the network node to a plurality of sub-resource units of one of the at least one resource units have different reference signal characteristics or unassociated reference signal characteristics, the measurement information related to the part of the plurality of sub-resource units comprises an index of the part of the plurality of sub-resource units and a measurement value of the reference signal corresponding to the part of the plurality of sub-resource units.

With reference to the second or the third possible implementation of the third aspect, in a sixth possible implementation, when the resource unit quantity is 1, and the resource unit type indicates that the reference signals mapped by the network node to the plurality of sub-resource units of the one resource unit have a same reference signal characteristic or an associated reference signal characteristic, the measurement information related to the part of the plurality of sub-resource units comprises a measurement value of the reference signal corresponding to the part of the plurality of sub-resource units.

With reference to the second or the third possible implementation of the third aspect, in a seventh possible implementation, when the resource unit quantity is greater than or equal to 2, and the resource unit type indicates that the reference signals mapped by the network node to a plurality of sub-resource units of one of the at least one resource unit have a same reference signal characteristic or an associated reference signal characteristic, the measurement information related to the part of the plurality of sub-resource units comprises an index of the part of the plurality of resource units and a measurement value of the reference signal corresponding to the part of the plurality of resource units.

With reference to the second or the third possible implementation of the third aspect, in an eighth possible implementation, when the resource unit quantity is greater than or equal to 2, and the resource unit type indicates that the reference signals mapped by the network node to a plurality of sub-resource units of a first one of the at least one resource unit have a same reference signal characteristic or an associated reference signal characteristic, and that the reference signals mapped by the network node to a plurality of sub-resource units of a second one of the at least one resource unit have different reference signal characteristics or unassociated reference signal characteristics, the measurement information related to the part of the plurality of sub-resource units comprises an index of part of sub-resource units of the second one of the at least one resource unit and a measurement value of the reference signal corresponding to the part of sub-resource units.

With reference to any one of the third to the eighth possible implementations of the third aspect, in a ninth possible implementation, the same reference signal characteristic includes at least one of the following characteristics: a same transmitting beam, a same precoding, a same beam identifier, a same precoding identifier, a same angle of departure, and a same antenna port; and the associated reference signal characteristic includes a quasi co-location QCL relationship.

With reference to any one of the foregoing possible implementations, in a tenth possible implementation, the measurement information includes at least one of the following information: a resource unit index, a sub-resource unit index, and a measurement value.

With reference to the tenth possible implementation of the third aspect, in an eleventh possible implementation, the measurement value includes at least one of the following information: a reference signal received power RSRP, an RSRP quantized value, a channel quality indicator CQI, a signal to interference plus noise ratio SINR, an SINR quantized value, a precoding matrix indication PMI, and a rank indication RI.

According to a fourth aspect, a terminal is provided, including:

a transceiver, configured to: receive configuration information of reference signals from a network node, and receive, based on the configuration information, the reference signals mapped to at least one resource unit, wherein the at least one resource unit comprises a plurality of sub-resource units; and a processor, configured to measure the received reference signals, wherein the transceiver is further configured to send measurement information related to part of the plurality of sub-resource units.

With reference to the fourth aspect, in a first possible implementation, the configuration information of the reference signals comprises at least one of the following information: a resource unit type, a resource unit size, a resource unit quantity, and a resource unit sequence.

With reference to the first possible implementation of the fourth aspect, in a second possible implementation, the resource unit type indicates whether the reference signals mapped by the network node to the plurality of sub-resource units of the at least one resource unit have a same reference signal characteristic or an associated reference signal characteristic.

With reference to the first or the second possible implementation of the fourth aspect, in a third possible implementation, when the resource unit quantity is 1, and the resource unit type indicates that the reference signals mapped by the network node to the plurality of sub-resource units of the one resource unit have different reference signal characteristics or unassociated reference signal characteristics, the measurement information related to the part of the plurality of sub-resource units comprises an index of the part of the plurality of sub-resource units and an measurement value of the reference signal corresponding to the part of the plurality of sub-resource units.

With reference to the first or the second possible implementation of the fourth aspect, in a fourth possible implementation, when the resource unit quantity is greater than or equal to 2, and the resource unit type indicates that the reference signals mapped by the network node to a plurality of sub-resource units of one of the at least one resource units have different reference signal characteristics or unassociated reference signal characteristics, the measurement information related to the part of the plurality of sub-resource units comprises an index of the part of the plurality of sub-resource units and a measurement value of the reference signal corresponding to the part of the plurality of sub-resource units.

With reference to the first or the second possible implementation of the fourth aspect, in a fifth possible implementation, when the resource unit quantity is 1, and the resource unit type indicates that the reference signals mapped by the network node to the plurality of sub-resource units of the one resource unit have a same reference signal characteristic or an associated reference signal characteristic, the measurement information related to the part of the plurality of sub-resource units comprises a measurement value of the reference signal corresponding to the part of the plurality of sub-resource units.

With reference to the first or the second possible implementation of the fourth aspect, in a sixth possible implementation, when the resource unit quantity is greater than or equal to 2, and the resource unit type indicates that the reference signals mapped by the network node to a plurality of sub-resource units of one of the at least one resource unit have a same reference signal characteristic or an associated reference signal characteristic, the measurement information related to the part of the plurality of sub-resource units comprises an index of the part of the plurality of resource units and a measurement value of the reference signal corresponding to the part of the plurality of resource units.

With reference to the first or the second possible implementation of the fourth aspect, in a seventh possible implementation, when the resource unit quantity is greater than or equal to 2, and the resource unit type indicates that the reference signals mapped by the network node to a plurality of sub-resource units of a first one of the at least one resource unit have a same reference signal characteristic or an associated reference signal characteristic, and that the reference signals mapped by the network node to a plurality of sub-resource units of a second one of the at least one resource unit have different reference signal characteristics or unassociated reference signal characteristics, the measurement information related to the part of the plurality of sub-resource units comprises an index of part of sub-resource units of the second one of the at least one resource unit and a measurement value of the reference signal corresponding to the part of sub-resource units.

With reference to any one of the second to the seventh possible implementations of the fourth aspect, in an eighth possible implementation, the same reference signal characteristic includes at least one of the following characteristics: a same transmitting beam, a same precoding, a same beam identifier, a same precoding identifier, a same angle of departure, and a same antenna port; and the associated reference signal characteristic includes a quasi co-location QCL relationship.

With reference to any one of the foregoing possible implementations, in a ninth possible implementation, the measurement information includes at least one of the following information: a resource unit index, a sub-resource unit index, and a measurement value.

With reference to the ninth possible implementation of the fourth aspect, in a tenth possible implementation, the measurement value includes at least one of the following information: a reference signal received power RSRP, an RSRP quantized value, a channel quality indicator CQI, a signal to interference plus noise ratio SINR, an SINR quantized value, a precoding matrix indication PMI, and a rank indication RI.

In a possible design, the network node provided in this application may include a corresponding module that performs behavior of the network node in the foregoing method, and the module may be software and/or hardware.

In a possible design, the terminal provided in this application may include a corresponding module that performs behavior of the terminal in the foregoing method, and the module may be software and/or hardware.

According to a fifth aspect, a communications system is provided, where the system includes the network node and the terminal described in the third aspect and the fourth aspect, or the network node, the terminal, and a core network.

According to a sixth aspect, a computer storage medium is provided, where the computer storage medium includes a program related to an implementation of the foregoing first to fourth aspects.

According to a seventh aspect, a resource request method is provided, including:

receiving, by a network node, a reference signal sending request from a terminal, where the reference signal sending request includes at least one of the following information: a resource unit type, a resource unit size, a resource unit quantity, a reference signal mapping manner, and a resource unit sequence.

According to an eighth aspect, a resource request method is provided, including:

sending, by a terminal, a reference signal sending request to a network node, where the reference signal sending request includes at least one of the following information: a resource unit type, a resource unit size, a resource unit quantity, a reference signal mapping manner, and a resource unit sequence.

According to a ninth aspect, a network node is provided, including:

a transceiver, configured to receive a reference signal sending request from a terminal; and a processor, configured to obtain at least one of the following information from the reference signal sending request: a resource unit type, a resource unit size, a resource unit quantity, a reference signal mapping manner, and a resource unit sequence.

According to a tenth aspect, a terminal is provided, including:

a processor, configured to generate a reference signal sending request, where the reference signal sending request includes at least one of the following information: a resource unit type, a resource unit size, a resource unit quantity, a reference signal mapping manner, and a resource unit sequence; and a transceiver, configured to send the reference signal sending request to a network node.

In a possible design, the network node provided in this application may include a corresponding module that performs behavior of the network node in the foregoing method, and the module may be software and/or hardware.

In a possible design, the terminal provided in this application may include a corresponding module that performs behavior of the terminal in the foregoing method, and the module may be software and/or hardware.

According to an eleventh aspect, a communications system is provided, where the system includes the network node and the terminal described in the ninth aspect and the tenth aspect, or the network node, the terminal, and a core network.

According to a twelfth aspect, a computer storage medium is provided, where the computer storage medium includes a program related to an implementation of the foregoing seventh to tenth aspects.

According to another aspect of this application, a computer program product including an instruction is provided, where when the instruction runs on a computer, the computer is enabled to execute the methods in the foregoing aspects.

BRIEF DESCRIPTION OF DRAWINGS

To describe the technical solutions in the embodiments of the present invention more clearly, the following briefly describes the accompanying drawings required for describing the embodiments or the prior art.

DESCRIPTION OF EMBODIMENTS

With reference to the accompanying drawings, the following describes in detail the embodiments provided in the present invention. Network architectures and service scenarios described in the embodiments of the present invention aim to describe the technical solutions in the embodiments of the present invention more clearly, but are not intended to limit the technical solutions provided in the embodiments of the present invention. A person of ordinary skill in the art may know that, as the network architectures evolve and a new service scenario emerges, the technical solutions provided in the embodiments of the present invention are also applicable to a similar technical problem.

Figure 1:
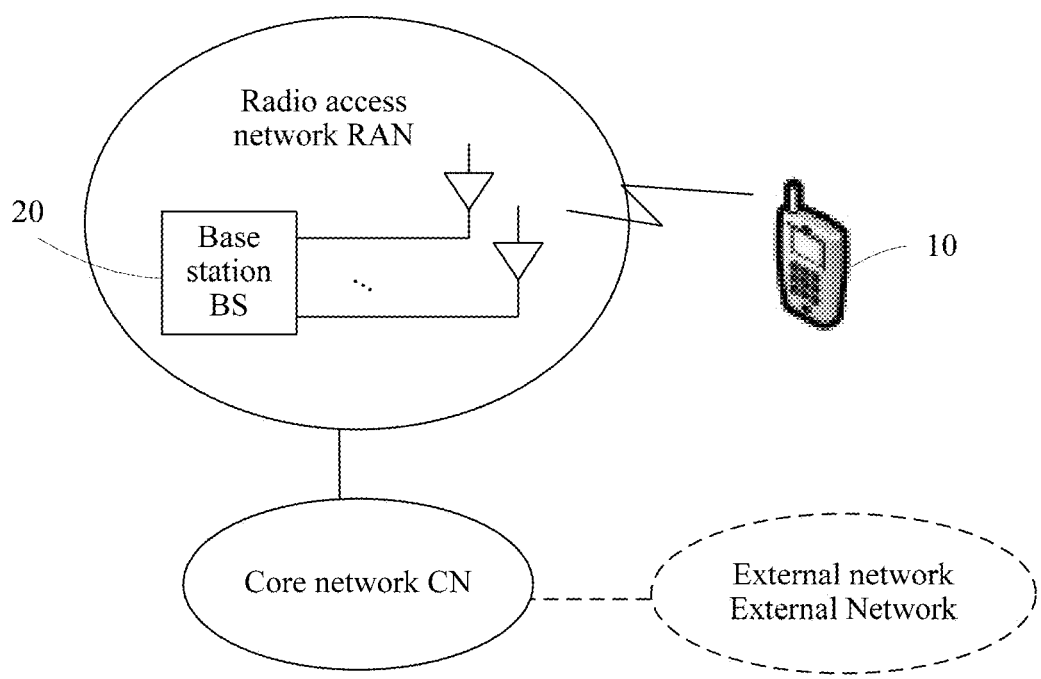
FIG. 1 is a schematic structural diagram of a possible system for implementing an embodiment of the present invention.

FIG. 1 is a schematic diagram of a possible system network in the present invention. As shown in FIG. 1, at least one terminal 10 communicates with a radio access network (RAN). The RAN includes at least one base station (BS) 20. For clarity, only one base station and one UE are shown in the figure. The RAN is connected to a core network (CN). Optionally, the CN may be coupled to one or more external networks such as the Internet and a public switched telephone network (PSTN).

To facilitate understanding, the following describes part terms included in this application.

In this application, terms "network" and "system" are usually interchangeably used, but meanings of the terms may be understood by a person skilled in the art. A user equipment (UE) is a terminal device having a communication function, may also be referred to as a terminal, and may include a handheld device, in-vehicle device, wearable device, or computing device that has a wireless communication function, another processing device connected to a wireless modem, or the like. The user equipment may have different names in different networks, for example, a terminal, a mobile station, a subscriber unit, a station, a cellular phone, a personal digital assistant, a wireless modem, a wireless communications device, a handheld device, a laptop computer, a cordless phone, and a wireless local loop station. For ease of description, in this application, these devices are referred to as a user equipment UE or a terminal. The base station (BS) may also be referred to as a base station device, and is a device deployed in the radio access network to provide a wireless communication function. The base station may have different names in different radio access systems. For example, the base station is referred to as a NodeB in a Universal Mobile Telecommunications System (UMTS) network, the base station is referred to as an evolved NodeB (eNB or eNodeB) in an LTE network, and the base station may be referred to as a transmission reception point (TRP), a network node, or a g-NodeB (gNB) in a future 5G system.

Figure 2:
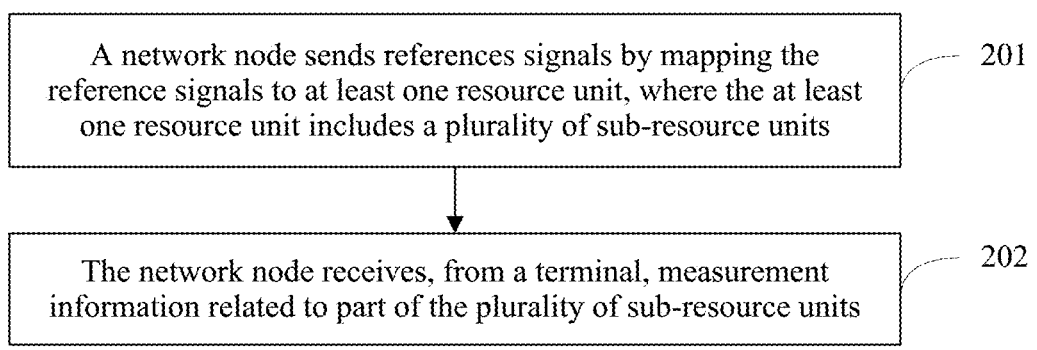
FIG. 2 is a flowchart of a reference signal transmission method according to an embodiment of the present invention.

An embodiment of the present invention provides a reference signal transmission method. The method may be applied to the system shown in FIG. 1. As shown in FIG. 2, the method includes the following steps:

Step 201. A network node sends reference signals by mapping the reference signals to at least one resource unit, where the at least one resource unit includes a plurality of sub-resource units.

Step 202. The network node receives, from a terminal, measurement information related to part of the plurality of sub-resource units.

Optionally, the foregoing method may further include the following step:

Step 203. The network node sends configuration information of the reference signals to the terminal.

Optionally, step 203 may be performed before step 201.

In the foregoing solution, the terminal selects, based on the configuration information of the reference signals, part of the measurement information to report, so that a quantity of channel resources occupied by the measurement information is reduced.

In this embodiment of the present invention, optionally, the reference signal is a channel state information-reference signal (CSI-RS).

In this embodiment of the present invention, the resource unit and the sub-resource unit each mean a segment of channel resource. The resource unit and sub-resource unit may be distinguished by time, and may be respectively referred to as a time unit (TU) and a sub-time unit (sub-TU). Different sub-TUs in a same TU may be time division multiplexing TDM or interleaved Frequency Division Multiple Access IFDMA (IFDMA). Alternatively, both of different resource units and different sub-resource units may be distinguished by frequency. Alternatively, both of different resource units and different sub-resource units may be distinguished by time, frequency, and/or code. The network node may send a CSI-RS on each sub-resource unit by using one or more beams.

Optionally, the configuration information of the reference signals includes at least one of the following information: a resource unit type, a resource unit size, a resource unit quantity, and a resource unit sequence.

Optionally, the resource unit sequence may be a sequence of a plurality of resource units of different resource unit types.

Optionally, the resource unit type indicates whether the reference signals mapped by the network node to a plurality of sub-resource units of the at least one resource unit have a same reference signal characteristic or an associated reference signal characteristic.

Optionally, the same reference signal characteristic includes at least one of the following characteristics: a same transmitting beam, a same precoding, a same beam identifier, a same precoding identifier, a same angle of departure, and a same antenna port; and the associated reference signal characteristic includes a quasi co-location (QCL) relationship.

In this embodiment of the present invention, optionally, the QCL relationship means that reference signal antenna ports have a same parameter; or the QCL relationship means that the terminal may determine, based on a parameter of an antenna port, a parameter of an antenna port that has a QCL relationship with the antenna port; or the QCL relationship means that two antenna ports have a same parameter; or the QCL relationship means that a parameter difference between two antenna ports is less than a threshold. The parameter may be at least one of delay spread, Doppler spread, a Doppler shift, an average delay, an average gain, an angle of arrival (AOA), an average AOA, AOA spread, an angle of departure (AOD), an average angle of departure AOD, AOD spread, a receive antenna spatial correlation parameter, a transmitting antenna spatial correlation parameter, a transmitting beam, a receiving beam, and a resource identifier. The beam includes at least one of a precoding, a weight sequence number, and a beam sequence number. The angles may be decomposition values at different dimensions or a combination of decomposition values at different dimensions. The antenna ports are antenna ports having different antenna port numbers, and/or antenna ports that have a same antenna port number and that are used to send or receive information on different time, frequency, and/or code domain resources, and/or antenna ports that have different antenna port numbers and that are used to send or receive information on different time, frequency, and/or code domain resources. The resource identifier includes a channel state information-reference signal (CSI-RS) resource identifier or an SRS resource identifier, and is used to indicate a beam on a resource.

The measurement information may include at least one of the following information: a resource unit index, a sub-resource unit index, a measurement value, and a reference signal resource index.

The measurement value may include at least one of the following information: a reference signal received power RSRP, an RSRP quantized value, a channel quality indicator CQI, a signal to interference plus noise ratio SINR, an SINR quantized value, a precoding matrix indication PMI, and a rank indication RI.

In this embodiment of the present invention, optionally, that the terminal reports the measurement information related to the part of the sub-resource units may include a plurality of cases. For example, the terminal reports only an index of part of resource units and a measurement value of a corresponding reference signal, or reports only an index of part of sub-resource units and a measurement value of a corresponding reference signal, or reports only part of measurement values, or reports only an index of part of sub-resource units of one resource unit and an measurement value of a corresponding reference signal, or reports only part of the measurement information, for example, reports only one or two of the measurement value, the resource unit index, and the sub-resource unit index. Detailed description is provided below by using examples.

The following uses examples to describe how the terminal determines to-be-reported measurement information based on the configuration information in this embodiment of the present invention. For ease of description, an example in which the resource unit and the sub-resource unit are respectively a TU and a sub-TU, one TU includes four sub-TUs, and the same reference signal characteristic is a same transmitting beam is used below for description.

Figure 3:
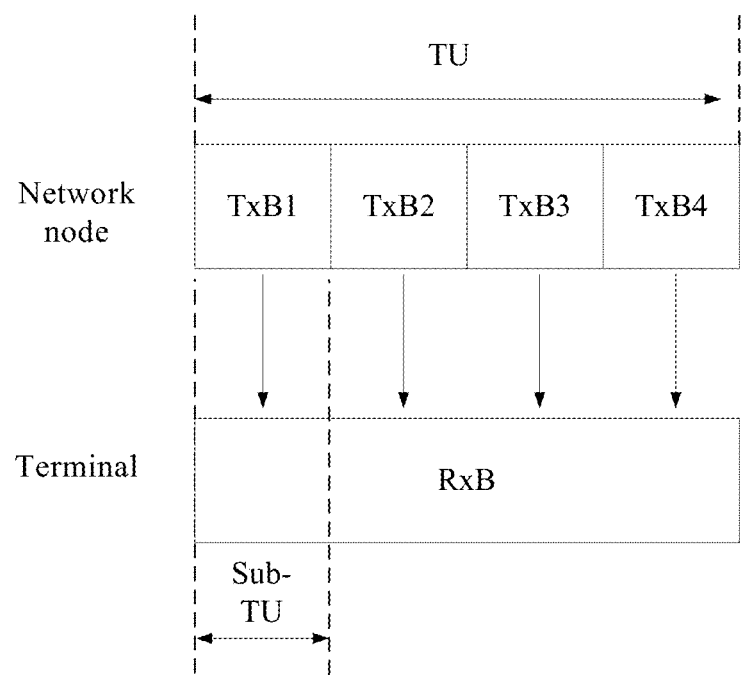
FIG. 3 is a schematic diagram of beam configuration according to an embodiment of the present invention.

Scenario 1: As shown in FIG. 3, when a TU quantity is 1, and the resource unit type indicates that reference signals of a plurality of sub-TUs of the one TU have different transmitting beams, the reported measurement information includes an index of a sub-TU and a measurement value of the reference signal corresponding to the sub-TU.

Figure 4:
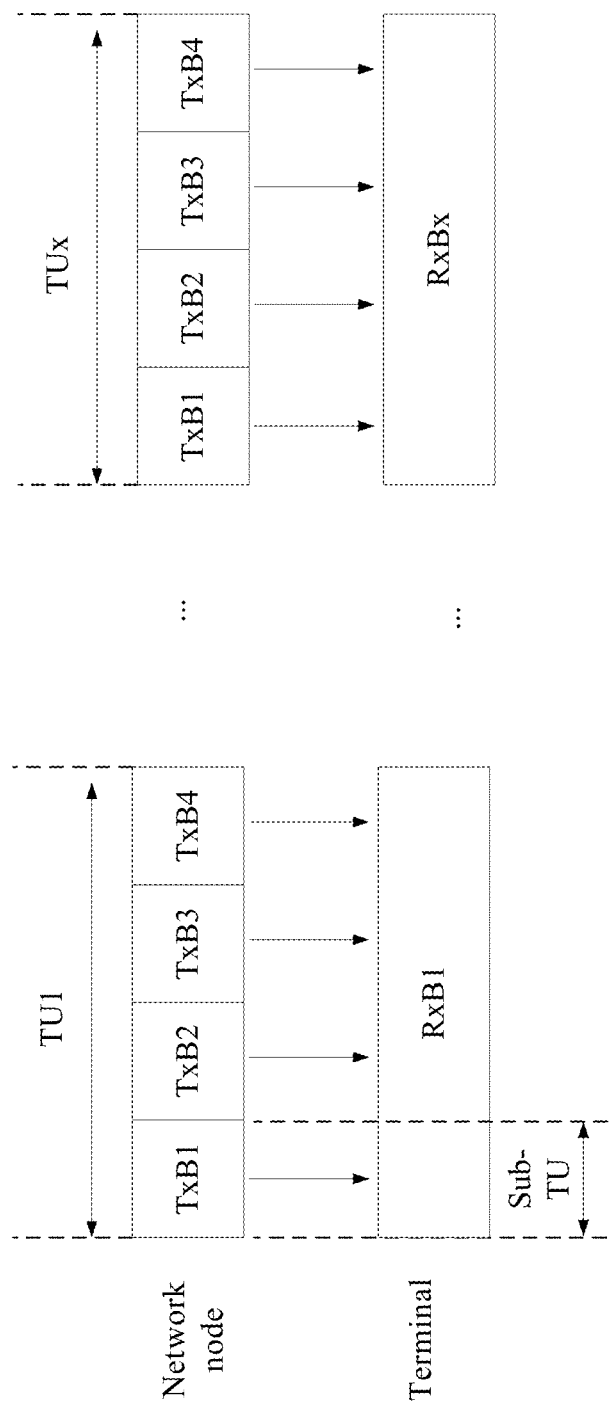
FIG. 4 is a schematic diagram of another type of beam configuration according to an embodiment of the present invention.

Scenario 2: As shown in FIG. 4, when a TU quantity is greater than or equal to 2, and the resource unit type indicates that reference signals of a plurality of sub-TUs of one TU have different transmitting beams, the reported measurement information includes an index of a sub-TU and a measurement value of the reference signal corresponding to the sub-TU.

Figure 5:
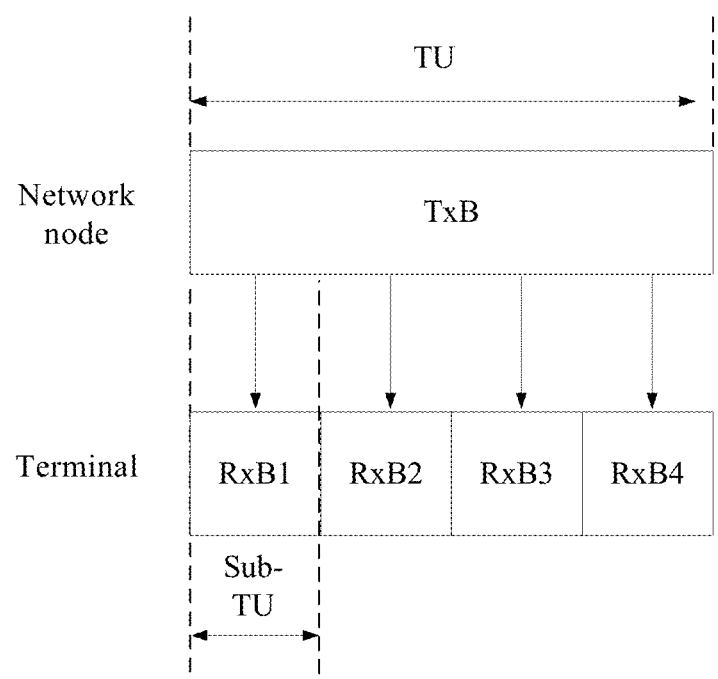
FIG. 5 is a schematic diagram of another type of beam configuration according to an embodiment of the present invention.

Scenario 3: As shown in FIG. 5, when a TU quantity is 1, and the resource unit type indicates that reference signals of a plurality of sub-TUs of the one TU have a same transmitting beam, the reported measurement information includes a measurement value of the reference signal corresponding to part of the sub-TUs.

Figure 6:
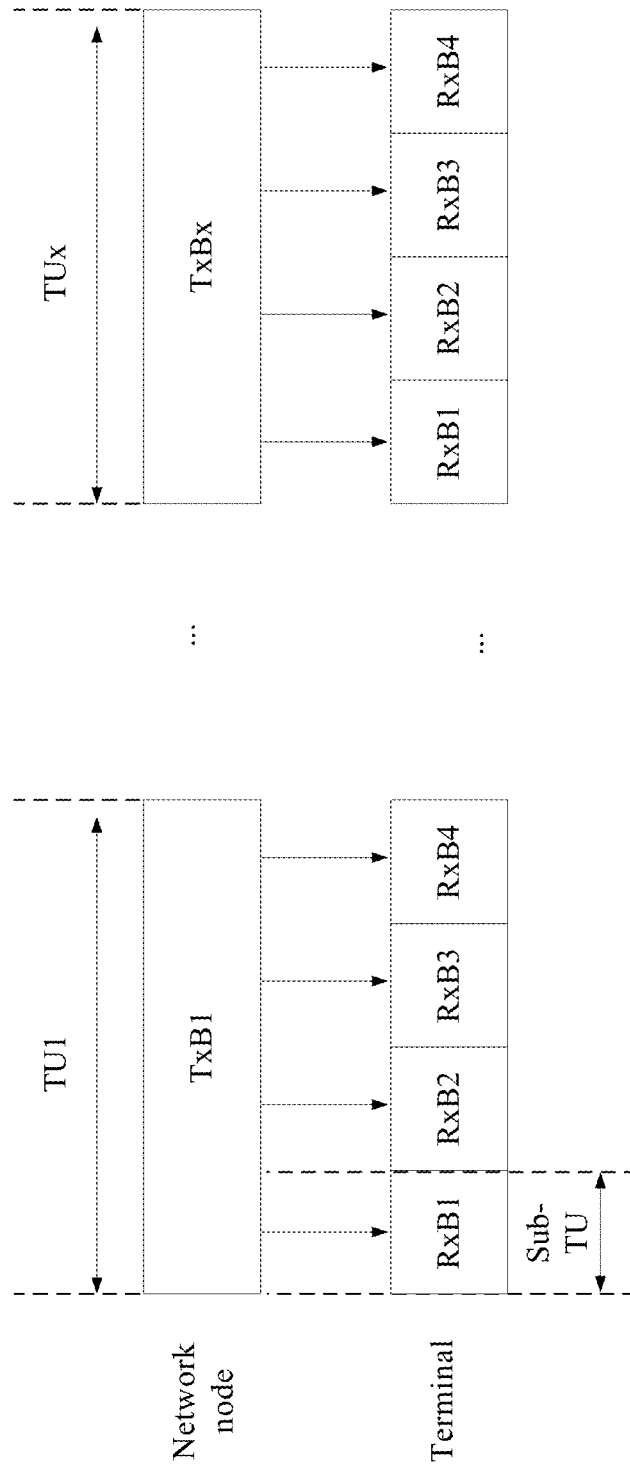
FIG. 6 is a schematic diagram of another type of beam configuration according to an embodiment of the present invention.

Scenario 4: As shown in FIG. 6, when a TU quantity is greater than or equal to 2, and the resource unit type indicates that reference signals of a plurality of sub-TUs of one TU have a same transmitting beam, the reported measurement information includes an index of part of the TUs and a measurement value of the reference signal corresponding to the part of the TUs.

Figure 7:
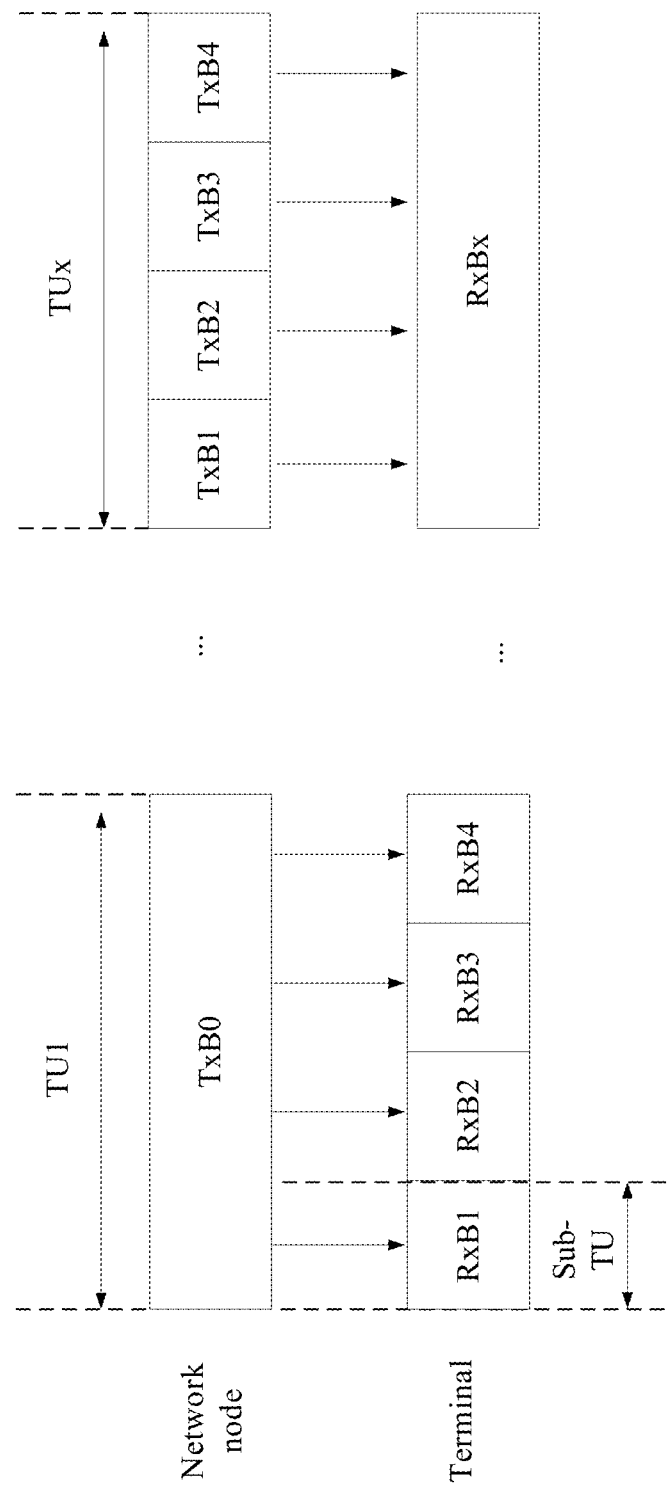
FIG. 7 is a schematic diagram of another type of beam configuration according to an embodiment of the present invention.

Scenario 5: As shown in FIG. 7, when a TU quantity is greater than or equal to 2, and the resource unit type indicates that reference signals of a plurality of sub-TUs of a TU have a same transmitting beam, and that reference signals of a plurality of sub-TUs of another TU have different transmitting beams, if the sequence of resource units of different resource unit types is that the TU whose plurality of sub-TUs' reference signals have a same transmitting beam is before the TU whose plurality of sub-TUs' reference signals have different transmitting beams, the reported measurement information includes an index of a sub-TU of the TU whose plurality of sub-TUs' reference signals have different transmitting beams and a measurement value of the reference signal corresponding to the sub-TU. If the sequence of resource units of different resource unit types is that the TU whose plurality of sub-TUs' reference signals have a same transmitting beam is after the TU whose plurality of sub-TUs' reference signals have different transmitting beams, reporting is performed according to the method in Scenario 1 for the TU whose plurality of sub-TUs' reference signals have different transmitting beams, and reporting is performed according to the method in Scenario 3 for the TU whose plurality of sub-TUs' reference signals have a same transmitting beam. The sequence of resource units of different resource unit types may be predefined, or may be configured by the base station in the configuration information of the reference signal.

In FIG. 3 to FIG. 7, TxB and RxB respectively represent a base station transmitting beam and a terminal receiving beam.

Optionally, in Scenario 1 to Scenario 5, the transmitting beam may further be at least one of the following: a transmitting beam identifier, a transmitting weight, a precoding, a precoding identifier, an angle of departure, a transmitting antenna port, and a transmitting end spatial characteristic.

Optionally, an example in which the resource unit type indicates whether the reference signals mapped by the base station to the plurality of sub-resource units of the at least one resource unit have an associated reference signal characteristic is used below for description.

Optionally, in this example, the associated reference signal characteristic is a reference signal QCL relationship. If a reference signal parameter indicated by the reference signal QCL relationship includes at least one of the following transmitting-end related parameters: a transmitting beam, an angle of departure, an average angle of departure, a transmitting antenna spatial correlation parameter, a resource identifier, and the like, the following scenarios are included:

Scenario 6: As shown in FIG. 3, when a TU quantity is 1, and the resource unit type indicates that there is no QCL relationship between all antenna ports or same antenna ports of reference signals of a plurality of sub-TUs of the one TU, the reported measurement information includes an index of a sub-TU and a measurement value of the reference signal corresponding to the sub-TU.

Scenario 7: As shown in FIG. 4, when a TU quantity is greater than or equal to 2, and the resource unit type indicates that there is no QCL relationship between all antenna ports or same antenna ports of reference signals of a plurality of sub-TUs of one TU, the reported measurement information includes an index of a sub-TU and a measurement value of the reference signal corresponding to the sub-TU.

Scenario 8: As shown in FIG. 5, when a TU quantity is 1, and the resource unit type indicates that there is a QCL relationship between all antenna ports or same antenna ports of reference signals of a plurality of sub-TUs of the one TU, the reported measurement information includes a measurement value of a reference signals corresponding to part of the sub-TUs.

Scenario 9: As shown in FIG. 6, when a TU quantity is greater than or equal to 2, and the resource unit type indicates that there is a QCL relationship between all antenna ports or same antenna ports of reference signals of a plurality of sub-TUs of one TU, the reported measurement information includes an index of part of the TUs and a measurement value of the reference signal corresponding to part of the TUs.

Scenario 10: As shown in FIG. 7, when a TU quantity is greater than or equal to 2, and the resource unit type indicates that there is a QCL relationship between all antenna ports or same antenna ports of reference signals of a plurality of sub-TUs of a TU, and that there is no QCL relationship between all antenna ports or same antenna ports of reference signals of a plurality of sub-TUs of another TU, if the sequence of resource units of different resource unit types is that the TU whose plurality of sub-TUs' reference signals have a QCL relationship between all antenna ports or same antenna ports is before the TU whose plurality of sub-TUs' reference signals have no QCL relationship between all antenna ports or same antenna ports, the reported measurement information includes an index of a sub-TU of the TU whose plurality of sub-TUs' reference signals have no QCL relationship between all antenna ports or same antenna ports, and a measurement value of the reference signal corresponding to the sub-TU. If the sequence of resource units of different resource unit types is that the TU whose plurality of sub-TUs' reference signals have a QCL relationship between all antenna ports or same antenna ports is after the TU whose plurality of sub-TUs' reference signals have no QCL relationship between all antenna ports or same antenna ports, reporting is performed according to the method in Scenario 6 for the TU whose plurality of sub-TUs' reference signals have no QCL relationship between all antenna ports or same antenna ports, and reporting is performed according to the method in Scenario 8 for the TU whose plurality of sub-TUs' reference signals have a QCL relationship between all antenna ports or same antenna ports. The sequence of resource units of different resource unit types may be predefined, or may be configured by the base station in the configuration information of the reference signal.

Optionally, in this example, the associated reference signal characteristic is a reference signal QCL relationship. If a reference signal parameter indicated by the reference signal QCL relationship includes at least one of the following receiving-end related parameters: a receiving beam, an angle of arrival, an average angle of arrival, a receiving antenna spatial correlation parameter, a resource identifier, and the like, the following scenarios are included:

Scenario 11: As shown in FIG. 3, when a TU quantity is 1, and the resource unit type indicates that there is a QCL relationship between all antenna ports or same antenna ports of reference signals of a plurality of sub-TUs of the one TU, the reported measurement information includes an index of a sub-TU and a measurement value of the reference signal corresponding to the sub-TU.

Scenario 12: As shown in FIG. 4, when a TU quantity is greater than or equal to 2, and the resource unit type indicates that there is a QCL relationship between all antenna ports or same antenna ports of reference signals of a plurality of sub-TUs of one TU, the reported measurement information includes an index of a sub-TU and a measurement value of the reference signal corresponding to the sub-TU.

Scenario 13: As shown in FIG. 5, when a TU quantity is 1, and the resource unit type indicates that there is no QCL relationship between all antenna ports or same antenna ports of reference signals of a plurality of sub-TUs of the one TU, the reported measurement information includes a measurement value of the reference signal corresponding to part of the sub-TUs.

Scenario 14: As shown in FIG. 6, when a TU quantity is greater than or equal to 2, and the resource unit type indicates that there is no QCL relationship between all antenna ports or same antenna ports of reference signals of a plurality of sub-TUs of one TU, the reported measurement information includes an index of part of the TUs and a measurement value of the reference signal corresponding to the part of the TUs.

Scenario 15: As shown in FIG. 7, when a TU quantity is greater than or equal to 2, and the resource unit type indicates that there is no QCL relationship between all antenna ports or same antenna ports of reference signals of a plurality of sub-TUs of a TU, and that there is a QCL relationship between all antenna ports or same antenna ports of reference signals of a plurality of sub-TUs of another TU, if the sequence of resource units of different resource unit types is that the TU whose plurality of sub-TUs' reference signals have no QCL relationship between all antenna ports or same antenna ports is before the TU whose plurality of sub-TUs' reference signals have a QCL relationship between all antenna ports or same antenna ports, the reported measurement information includes an index of a sub-TU of the TU whose plurality of sub-TUs' reference signals have a QCL relationship between all antenna ports or same antenna ports, and a measurement value of the reference signal corresponding to the sub-TU. If the sequence of resource units of different resource unit types is that the TU whose plurality of sub-TUs' reference signals have no QCL relationship between all antenna ports or same antenna ports is after the TU whose plurality of sub-TUs' reference signals have a QCL relationship between all antenna ports or same antenna ports, reporting is performed according to the method in Scenario 11 for the TU whose plurality of sub-TUs' reference signals have a QCL relationship between all antenna ports or same antenna ports, and reporting is performed according to the method in Scenario 13 for the TU whose plurality of sub-TUs' reference signals have no QCL relationship between all antenna ports or same antenna ports. The sequence of resource units of different resource unit types may be predefined, or may be configured by the base station in the configuration information of the reference signal.

An example in which the same reference signal characteristic is a same receiving beam is used below for description.

Scenario 16: As shown in FIG. 3, when a TU quantity is 1, and the resource unit type indicates that reference signals of a plurality of sub-TUs of the one TU have a same receiving beam, the reported measurement information includes an index of a sub-TU and a measurement value of the reference signal corresponding to the sub-TU.

Scenario 17: As shown in FIG. 4, when a TU quantity is greater than or equal to 2, and the resource unit type indicates that reference signals of a plurality of sub-TUs of one TU have a same receiving beam, the reported measurement information includes an index of a sub-TU and a measurement value of the reference signal corresponding to the sub-TU.

Scenario 18: As shown in FIG. 5, when a TU quantity is 1, and the resource unit type indicates that reference signals of a plurality of sub-TUs of the one TU have different receiving beams, the reported measurement information includes a measurement value of the reference signal corresponding to part of the sub-TUs.

Scenario 19: As shown in FIG. 6, when a TU quantity is greater than or equal to 2, and the resource unit type indicates that reference signals of a plurality of sub-TUs of one TU have different receiving beams, the reported measurement information includes an index of part of the TUs and a measurement value of the reference signal corresponding to the part of the TUs.

Scenario 20: As shown in FIG. 7, when a TU quantity is greater than or equal to 2, and the resource unit type indicates that reference signals of a plurality of sub-TUs of a TU have different receiving beams, and that reference signals of a plurality of sub-TUs of another TU have a same receiving beam, if the sequence of resource units of different resource unit types is that the TU whose plurality of sub-TUs' reference signals have different receiving beams is before the TU whose plurality of sub-TUs' reference signals have a same receiving beam, the reported measurement information includes an index of a sub-TU of the TU whose plurality of sub-TUs' reference signals have a same receiving beam and a measurement value of the reference signal corresponding to the sub-TU. If the sequence of resource units of different resource unit types is that the TU whose plurality of sub-TUs' reference signals have different receiving beams is after the TU whose plurality of sub-TUs' reference signals have a same receiving beam, reporting is performed according to the method in Scenario 1 for the TU whose plurality of sub-TUs' reference signals have a same receiving beam, and reporting is performed according to the method in Scenario 3 for the TU whose plurality of sub-TUs' reference signals have different receiving beams. The sequence of resource units of different resource unit types may be predefined, or may be configured by the base station in the configuration information of the reference signal.

Optionally, in Scenario 16 to Scenario 20, the receiving beam may further be at least one of the following: a receiving beam identifier, a receiving weight, an angle of arrival, a receiving antenna port, and a receiving end spatial characteristic.

Optionally, the sub-TU in Scenario 1 to Scenario 20 may further be a reference signal resource or another sub-resource unit, and the sub-TU index in Scenario 1 to Scenario 5 may further be a reference signal resource index or another sub-resource unit index.

Optionally, the measurement information reported by the terminal in Scenario 1 to Scenario 20 includes measurement information other than the measurement value, namely, includes no measurement value.

Optionally, the measurement value in the measurement information reported by the terminal in Scenario 1 to Scenario 20 includes m optimal measurement values and n worst measurement values, where m and n are values greater than or equal to 0, m+n is greater than or equal to 1, m is configured by the base station or is predefined, and n is configured by the base station or is predefined.

Optionally, before the terminal reports the measurement information, the base station sends a reference signal measurement report indication to the terminal. The reference signal measurement report indication is used to indicate whether the reported measurement information is related to uplink or downlink transmission existing after the measurement information is reported, or is used to indicate whether the reported measurement information is related to the resource unit type, or is used to indicate whether the reported measurement information includes a resource unit index and a sub-resource unit index. If the reference signal measurement report indication is used to indicate that the reported measurement information is not related to uplink or downlink transmission existing after the measurement information is reported, or is used to indicate that the reported measurement information is not related to the resource unit type, or is used to indicate that the reported measurement information includes a resource unit index and a sub-resource unit index, the measurement information reported by the terminal includes a resource unit index, a sub-resource unit index, and a measurement value, or a sub-resource unit index and a measurement value, or a sub-resource unit index, or a resource unit index and a sub-resource unit index. Otherwise, the measurement information reported by the terminal is determined based on the resource unit type according to the manners in Scenario 1 to Scenario 20.

Optionally, the measurement information reported by the terminal includes a resource unit index, a sub-resource unit index, and a measurement value, or a sub-resource unit index and a measurement value, or a sub-resource unit index, or a resource unit index and a sub-resource unit index.

Optionally, in the foregoing scenarios, a quantity of reported indexes and a quantity of reported measurement values may be different. For example, one index may be corresponding to a plurality of measurement values. The terminal may report only the index.

In this embodiment of the present invention, optionally, the base station may configure the measurement information reported by the terminal, and the terminal determines the resource unit type of the reference signal based on the configuration.

Optionally, when one resource unit includes only one sub-resource unit (namely, the resource unit is not divided into sub-resource units), it may be understood that the sub-resource unit is a resource unit.

Figure 8:
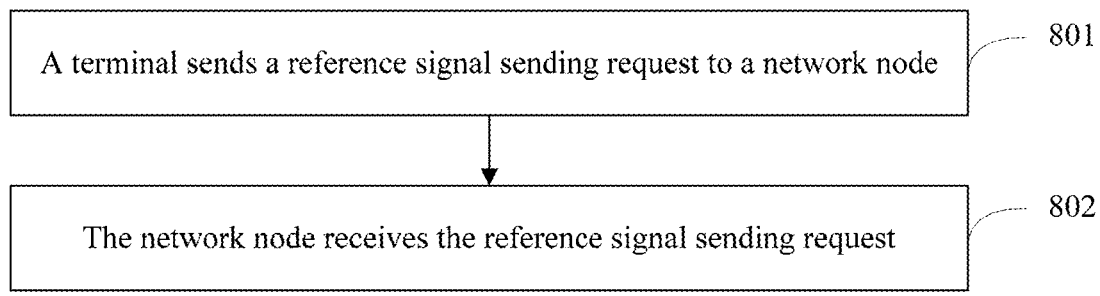
FIG. 8 is a flowchart of a resource request method according to an embodiment of the present invention.

Another embodiment of the present invention provides a resource request method. The method may be applied to the system shown in FIG. 1. As shown in FIG. 8, the method includes the following steps:

Step 801. A terminal sends a reference signal sending request to a network node.

The reference signal sending request includes at least one of the following information: a resource unit type, a resource unit size, a resource unit quantity, a reference signal mapping manner, and a resource unit sequence.

Step 802. The network node receives the reference signal sending request.

Optionally, a reference signal may be a reference signal used for downlink measurement, for example, a CSI-RS, or may be a reference signal used for uplink measurement, for example, a sounding reference symbol.

In the foregoing embodiment, the base station may determine, based on the request of the terminal, a resource used to send a corresponding reference signal.

The following uses examples to describe the step in which the terminal sends the reference signal sending request in this embodiment of the present invention.

Optionally, that the terminal sends a CSI-RS sending request includes the following scenarios:

CSI-RS resource request scenario 1: The terminal sends the CSI-RS sending request, including the following information: A resource unit size of CSI-RSs is four sub-resource units, a resource unit quantity is 2, and a resource unit type is that a same transmitting beam is used on sub-resource units of the resource units.

CSI-RS resource request scenario 2: For example, the terminal sends the CSI-RS sending request, including the following information: A resource unit size of CSI-RSs is four sub-resource units, a resource unit quantity is 2, and a resource unit type is that different transmitting beams are used on sub-resource units of the resource units.

Optionally, in the CSI-RS resource request scenarios 1 and 2, the transmitting beam may further be at least one of the following: a transmitting beam identifier, a transmitting weight, a precoding, a precoding identifier, an angle of departure, a transmitting antenna port, and a transmitting end spatial characteristic.

CSI-RS resource request scenario 3: The terminal sends the CSI-RS sending request, including the following information: A resource unit size of CSI-RSs is four sub-resource units, a resource unit quantity is 2, and a resource unit type is that different receiving beams are used on sub-resource units of the resource units.

CSI-RS resource request scenario 4: For example, the terminal sends the CSI-RS sending request, including the following information: A resource unit size of CSI-RSs is four sub-resource units, a resource unit quantity is 2, and a resource unit type is that a same receiving beam is used on sub-resource units of the resource units.

Optionally, in CSI-RS resource request scenarios 3 and 4, the receiving beam may further be at least one of the following: a receiving beam identifier, a receiving weight, an angle of arrival, a receiving antenna port, and a receiving end spatial characteristic.

CSI-RS resource request scenario 5: The terminal sends the CSI-RS sending request, including the following information: A resource unit size of CSI-RSs is four sub-resource units, a resource unit quantity is 2, and a resource unit type is that there is a QCL relationship between all antenna ports or same antenna ports on sub-resource units of the resource units.

CSI-RS resource request scenario 6: For example, the terminal sends the CSI-RS sending request, including the following information: A resource unit size of CSI-RSs is four sub-resource units, a resource unit quantity is 2, and a resource unit type is that there is no QCL relationship between all antenna ports or same antenna ports on sub-resource units of the resource units.

Optionally, that the terminal sends an SRS sending request includes the following scenarios:

SRS resource request scenario 1: The terminal sends the SRS sending request, including the following information: A resource unit size of SRSs is four sub-resource units, a resource unit quantity is 2, and a resource unit type is that a same transmitting beam is used on sub-resource units of the resource units.

SRS resource request scenario 2: For example, the terminal sends the SRS sending request, including the following information: A resource unit size of SRSs is four sub-resource units, a resource unit quantity is 2, and a resource unit type is that different transmitting beams are used on sub-resource units of the resource units.

Optionally, in the SRS resource request scenarios 1 and 2, the transmitting beam may further be at least one of the following: a transmitting beam identifier, a transmitting beam weight, a precoding, a precoding identifier, an angle of departure, a transmitting antenna port, and a transmitting end spatial characteristic.

SRS resource request scenario 3: The terminal sends the SRS sending request, including the following information: A resource unit size of SRSs is four sub-resource units, a resource unit quantity is 2, and a resource unit type is that different receiving beams are used on sub-resource units of the resource units.

SRS resource request scenario 4: For example, the terminal sends the SRS sending request, including the following information: A resource unit size of SRSs is four sub-resource units, a resource unit quantity is 2, and a resource unit type is that a same receiving beam is used on sub-resource units of the resource units.

Optionally, in SRS resource request scenarios 3 and 4, the receiving beam may further be at least one of the following: a receiving beam identifier, a receiving weight, an angle of arrival, a receiving antenna port, and a receiving end spatial characteristic.

SRS resource request scenario 5: The terminal sends the SRS sending request, including the following information: A resource unit size of SRSs is four sub-resource units, a resource unit quantity is 2, and a resource unit type is that there is a QCL relationship between all antenna ports or same antenna ports on sub-resource units of the resource units.

SRS resource request scenario 6: For example, the terminal sends the SRS sending request, including the following information: A resource unit size of SRSs is four sub-resource units, a resource unit quantity is 2, and a resource unit type is that there is no QCL relationship between all antenna ports or same antenna ports on sub-resource units of the resource units.

Figure 9:
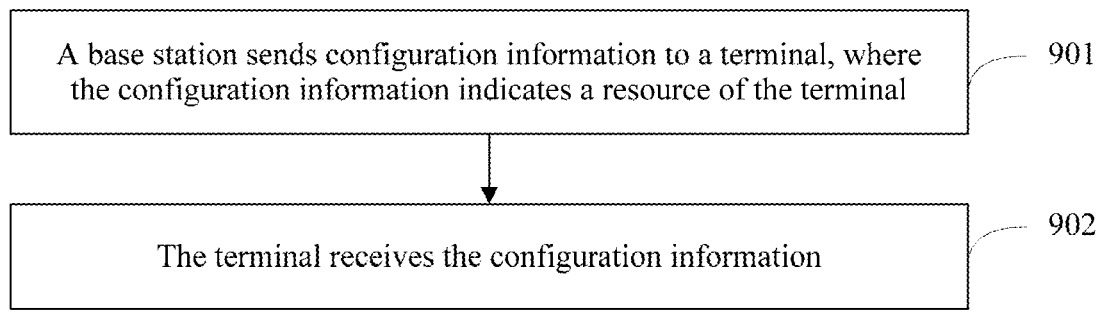
FIG. 9 is a flowchart of a beam indication method according to an embodiment of the present invention.

Another embodiment of the present invention provides a resource indication method. The method may be applied to the system shown in FIG. 1. As shown in FIG. 9, the method includes the following steps:

Step 901. A base station sends configuration information to a terminal, where the configuration information indicates a resource of the terminal.

Step 902. The terminal receives the configuration information.

Optionally, the resource includes at least one of the following resources: a receiving or transmitting beam, a receiving or transmitting beam index, a receiving or transmitting precoding, a receiving or transmitting precoding index, a receiving or transmitting antenna port, and a spatial resource.

Optionally, if the resource includes at least one of the following: a receiving beam, a receiving beam index, a receiving precoding, a receiving precoding index, a receiving antenna port, and a spatial resource, the resource may be used for downlink transmission, for example, physical downlink shared channel transmission, physical downlink control channel transmission, or CSI-RS transmission.

Optionally, if the resource includes at least one of the following: a transmitting beam, a transmitting beam index, a transmitting precoding, a transmitting precoding index, a transmitting antenna port, and a spatial resource, the resource may be used for uplink transmission, for example, physical uplink shared channel transmission, physical uplink control channel transmission, SRS transmission, or scheduling request transmission.

Optionally, the configuration information includes at least one of the following: a base station transmitting beam, a base station receiving beam, a terminal transmitting beam, a terminal receiving beam, a time domain resource, a frequency domain resource, a code domain resource, and an associated port characteristic.

Optionally, the beam includes at least one of a precoding, a weight sequence number, a beam sequence number, and a beam range. The associated port characteristic includes a QCL relationship between ports.

Optionally, the beam range includes a fixed beam range or a relative beam range.

Optionally, when the configuration information includes at least one of a time domain resource, a frequency domain resource, and a code domain resource, the resource indicated by the configuration information and transmission performed by using the resource of the terminal have a same port characteristic or an associated port characteristic. Optionally, the same port characteristic includes at least one of the following characteristics: a same transmitting beam, a same precoding, a same beam identifier, a same precoding identifier, a same angle of departure, and a same antenna port; and the associated port characteristic includes a quasi co-location QCL relationship.

The following uses examples to describe a step in which the base station configures the resource of the terminal in this embodiment of the present invention.

Example 1

Optionally, if the base station sends the configuration information to the terminal, and the configuration information includes a terminal receiving beam, for example, a sequence number of the terminal receiving beam, the terminal determines a downlink receiving beam based on the sequence number of the terminal receiving beam in the configuration information, to perform downlink receiving; or the terminal determines a transmitting beam based on the sequence number of the terminal receiving beam in the configuration information and a correspondence between a terminal receiving beam and a terminal transmitting beam, to perform uplink sending.

Example 2

Optionally, if the base station sends the configuration information to the terminal, and the configuration information includes a terminal transmitting beam, for example, a sequence number of the terminal transmitting beam, the terminal determines an uplink transmitting beam based on the sequence number of the terminal transmitting beam in the configuration information, to perform uplink sending; or the terminal determines a downlink receiving beam based on the sequence number of the terminal transmitting beam in the configuration information and a correspondence between a terminal transmitting beam and a terminal receiving beam, to perform downlink receiving.

Example 3

Optionally, if the base station sends the configuration information to the terminal, and the configuration information includes a base station transmitting beam, for example, a sequence number of the base station transmitting beam, the terminal determines a downlink receiving beam based on the sequence number of the base station transmitting beam in the configuration information and a beam pairing relationship between a base station transmitting beam and a terminal receiving beam, to perform downlink receiving; or the terminal determines an uplink transmitting beam based on the sequence number of the base station transmitting beam in the configuration information, a beam pairing relationship between a base station transmitting beam and a terminal receiving beam, and a correspondence between a terminal receiving beam and a terminal transmitting beam, to perform uplink sending.

Example 4

Optionally, if the base station sends the configuration information to the terminal, and the configuration information includes a base station receiving beam, for example, a sequence number of the base station receiving beam, the terminal determines an uplink transmitting beam based on the sequence number of the base station receiving beam in the configuration information and a beam pairing relationship between a base station receiving beam and a terminal transmitting beam, to perform uplink sending; or the terminal determines a downlink receiving beam based on the sequence number of the base station receiving beam in the configuration information, a beam pairing relationship between a base station receiving beam and a terminal transmitting beam, and a correspondence between a terminal transmitting beam and a terminal receiving beam, to perform downlink receiving.

Example 5

Optionally, if the base station sends the configuration information to the terminal, and the configuration information includes at least one of a time domain resource, a code domain resource, and a frequency domain resource, the terminal determines a downlink receiving beam based on the time/frequency/code resource in the configuration information and a terminal receiving beam used in transmission performed on the time/frequency/code resource, to perform downlink receiving; or the terminal determines a transmitting beam based on the time/frequency/code resource in the configuration information, a receiving beam used in transmission performed on the time/frequency/code resource, and a correspondence between a terminal receiving beam and a terminal transmitting beam, to perform uplink sending.

Example 6

Optionally, if the base station sends the configuration information to the terminal, and the configuration information includes at least one of a time domain resource, a code domain resource, and a frequency domain resource, the terminal determines an uplink transmitting beam based on the time/frequency/code resource in the configuration information and a terminal transmitting beam used in transmission performed on the time/frequency/code resource, to perform uplink sending; or the terminal determines a downlink receiving beam based on the time/frequency/code resource in the configuration information, a transmitting beam used in transmission performed on the time/frequency/code resource, and a correspondence between a terminal transmitting beam and a terminal receiving beam, to perform downlink receiving.

Example 7

Optionally, if the base station sends the configuration information to the terminal, and the configuration information includes at least one of a time domain resource, a code domain resource, and a frequency domain resource, the terminal determines a downlink receiving beam based on the time/frequency/code resource in the configuration information, a base station transmitting beam used in transmission performed on the time/frequency/code resource, and a beam pairing relationship between a base station transmitting beam and a terminal receiving beam, to perform downlink receiving; or the terminal determines an uplink transmitting beam based on the time/frequency/code resource in the configuration information, a base station transmitting beam used in transmission performed on the time/frequency/code resource, a beam pairing relationship between a base station transmitting beam and a terminal receiving beam, and a correspondence between a terminal receiving beam and a terminal transmitting beam, to perform uplink sending.

Example 8

Optionally, if the base station sends the configuration information to the terminal, and the configuration information includes at least one of a time domain resource, a code domain resource, and a frequency domain resource, the terminal determines an uplink transmitting beam based on the time/frequency/code resource in the configuration information, a base station receiving beam used in transmission performed on the time/frequency/code resource, and a beam pairing relationship between a base station receiving beam and a terminal transmitting beam, to perform uplink sending; or the terminal determines a downlink receiving beam based on the time/frequency/code resource in the configuration information, a base station receiving beam used in transmission performed on the time/frequency/code resource, a beam pairing relationship between a base station receiving beam and a terminal transmitting beam, and a correspondence between a terminal transmitting beam and a terminal receiving beam, to perform downlink receiving.

Optionally, the time domain resource, the code domain resource, or the frequency domain resource in the configuration information in Example 5 to Example 8 may be a QCL relationship between uplink or downlink transmission and a port on the time domain resource, the code domain resource, or the frequency domain resource. The terminal determines a beam on the time domain resource, the code domain resource, or the frequency domain resource based on the QCL relationship and the time domain resource, the code domain resource, or the frequency domain resource in the configuration information, to determine a transmitting beam of uplink transmission or a receiving beam of downlink transmission according to the methods in Example 5 to Example 8.

Optionally, if the time domain resource, the code domain resource, or the frequency domain resource in the configuration information in Example 5 to Example 8 is a time/frequency/code resource used to transmit a downlink or uplink measurement reference signal, the time domain resource, the code domain resource, or the frequency domain resource may be a resource unit and/or a sub-resource unit. The configuration information includes a sub-resource unit identifier if a resource unit type of the measurement reference signal is that sub-resource units in a resource unit have a same reference signal characteristic, or a reference signal parameter indicated by a reference signal QCL relationship includes at least one of the following transmitting-end related parameters: a transmitting beam, an angle of departure, an average angle of departure, a transmitting antenna spatial correlation parameter, a resource identifier, and the like, and there is a QCL relationship between all ports or same ports, or a reference signal parameter indicated by a reference signal QCL relationship includes at least one of the following receiving-end related parameters: a receiving beam, an angle of arrival, an average angle of arrival, a receiving antenna spatial correlation parameter, a resource identifier, and the like, and there is no QCL relationship between all ports or same ports. The configuration information includes a sub-resource unit identifier if a resource unit type of the measurement reference signal is that sub-resource units in a resource unit have different reference signal characteristics, or a reference signal parameter indicated by a reference signal QCL relationship includes at least one of the following transmitting-end related parameters: a transmitting beam, an angle of departure, an average angle of departure, a transmitting antenna spatial correlation parameter, a resource identifier, and the like, and there is no QCL relationship between all ports or same ports, or a reference signal parameter indicated by a reference signal QCL relationship includes at least one of the following receiving-end related parameters: a receiving beam, an angle of arrival, an average angle of arrival, a receiving antenna spatial correlation parameter, a resource identifier, and the like, and there is a QCL relationship between all ports or same ports.

Optionally, when a resource unit quantity of the reference signal is 1, the configuration information does not include a resource unit identifier.

Optionally, before the terminal performs uplink or downlink transmission, the base station receives reference signal measurement information reported by the terminal. In this case, the configuration information includes an identifier of the reference signal measurement information reported by the terminal and/or an identifier of reference signal measurement configuration.

The identifier of the reference signal measurement information includes at least one of the following: an identifier of a measurement value, an identifier of a resource unit index, an identifier of a sub-resource unit index, and an identifier of a reference signal resource index.

The identifier of the reference signal measurement configuration includes an identifier of configuration information used to configure the terminal to report reference signal measurement information once, or an identifier of a process or an event in which the terminal reports measurement information once.

The terminal determines, based on the identifier of the reference signal measurement information and the identifier of the reference signal measurement configuration, a beam on a resource on which reference signal measurement information is obtained through measurement in the reference signal measurement configuration, to determine a beam for uplink or downlink transmission.

The following uses examples to describe a step in which the base station uses the identifier of the reference signal measurement information and the identifier of the reference signal measurement configuration to configure the resource of the terminal in the present invention.

Example 9

Optionally, if the base station indicates that the identifier of the measurement information is 2 and the identifier of the reference signal measurement configuration is 1, the terminal determines a downlink receiving beam based on a terminal receiving beam on a resource on which the second measurement information in the first time of measurement reporting is obtained through measurement; or the terminal determines an uplink transmitting beam based on a correspondence between a terminal transmitting beam and a terminal receiving beam and a terminal receiving beam on a resource on which the second measurement information in the first time of measurement reporting is obtained through measurement.

Example 10

Optionally, if the base station indicates that the identifier of the measurement information is 2 and the identifier of the reference signal measurement configuration is 1, the terminal determines an uplink transmitting beam based on a terminal transmitting beam on a resource on which the second measurement information in the first time of measurement reporting is obtained through measurement; or the terminal determines a downlink receiving beam based on a correspondence between a terminal transmitting beam and a terminal receiving beam and a terminal transmitting beam on a resource on which the second measurement information in the first time of measurement reporting is obtained through measurement.

Example 11

Optionally, if the base station indicates that the identifier of the measurement information is 2 and the identifier of the reference signal measurement configuration is 1, the terminal determines an uplink transmitting beam based on a beam pairing relationship between a base station receiving beam and a terminal transmitting beam and a base station receiving beam on a resource on which the second measurement information in the first time of measurement reporting is obtained through measurement; or the terminal determines a downlink receiving beam based on a base station receiving beam on a resource on which the second measurement information in the first time of measurement reporting is obtained through measurement, a beam pairing relationship between a base station receiving beam and a terminal transmitting beam, and a correspondence between a terminal transmitting beam and a terminal receiving beam.

Example 12

Optionally, if the base station indicates that the identifier of the measurement information is 2 and the identifier of the reference signal measurement configuration is 1, the terminal determines a downlink receiving beam based on a beam pairing relationship between a base station transmitting beam and a terminal receiving beam and a base station transmitting beam on a resource on which the second measurement information in the first time of measurement reporting is obtained through measurement; or the terminal determines an uplink transmitting beam based on a base station transmitting beam on a resource on which the second measurement information in the first time of measurement reporting is obtained through measurement, a beam pairing relationship between a base station transmitting beam and a terminal receiving beam, and a correspondence between a terminal transmitting beam and a terminal receiving beam.

Optionally, the configuration information in Example 1 to Example 12 may further include a beam range. If the beam range is a relative range, after determining a beam according to the methods in Example 1 to Example 12, the terminal selects a beam in the beam range. For example, if a horizontal angle of the beam determined based on Example 1 to Example 12 is 30 degrees, and the beam range is −10 degrees to 10 degrees, the terminal selects a beam in a range of 20 degrees to 40 degrees. For another example, if a beam sequence number of the beam determined in Example 1 to Example 12 is 5, and the beam range is −2 to 2, the terminal selects a beam from beams whose beam sequence numbers are {3, 4, 5, 6, 7}. If the beam range is an absolute range, the terminal selects a beam in a configured beam range. For example, a beam horizontal angle ranges from 20 degrees to 40 degrees. For another example, a beam sequence number range is {3, 4, 5, 6, 7}.

Optionally, when a quantity of pieces of reported measurement information is 1, no measurement information identifier needs to be indicated.

Optionally, before uplink or downlink transmission, the base station further sends, to the terminal, an indication indicating whether the measurement information is associated with the configuration information. If the base station configures that the measurement information sent by the terminal is not associated with the configuration information, the configuration information does not include the identifier of the reference signal measurement information reported by the terminal.

In this embodiment of the present invention, for meanings of the configuration information and the reported measurement information, refer to explanations in the foregoing reference signal transmission method. Details are not described herein again.

It should be noted that, in the foregoing plurality of method embodiments, part or all steps and technical implementation details in different solutions may be combined for use.

The embodiments of the present invention further provide an apparatus embodiment for implementing steps and methods in the method embodiments. The methods, steps, technical details, and technical effects in the method embodiments are also applicable to the apparatus embodiment, and details are not described below again.

Figure 10:
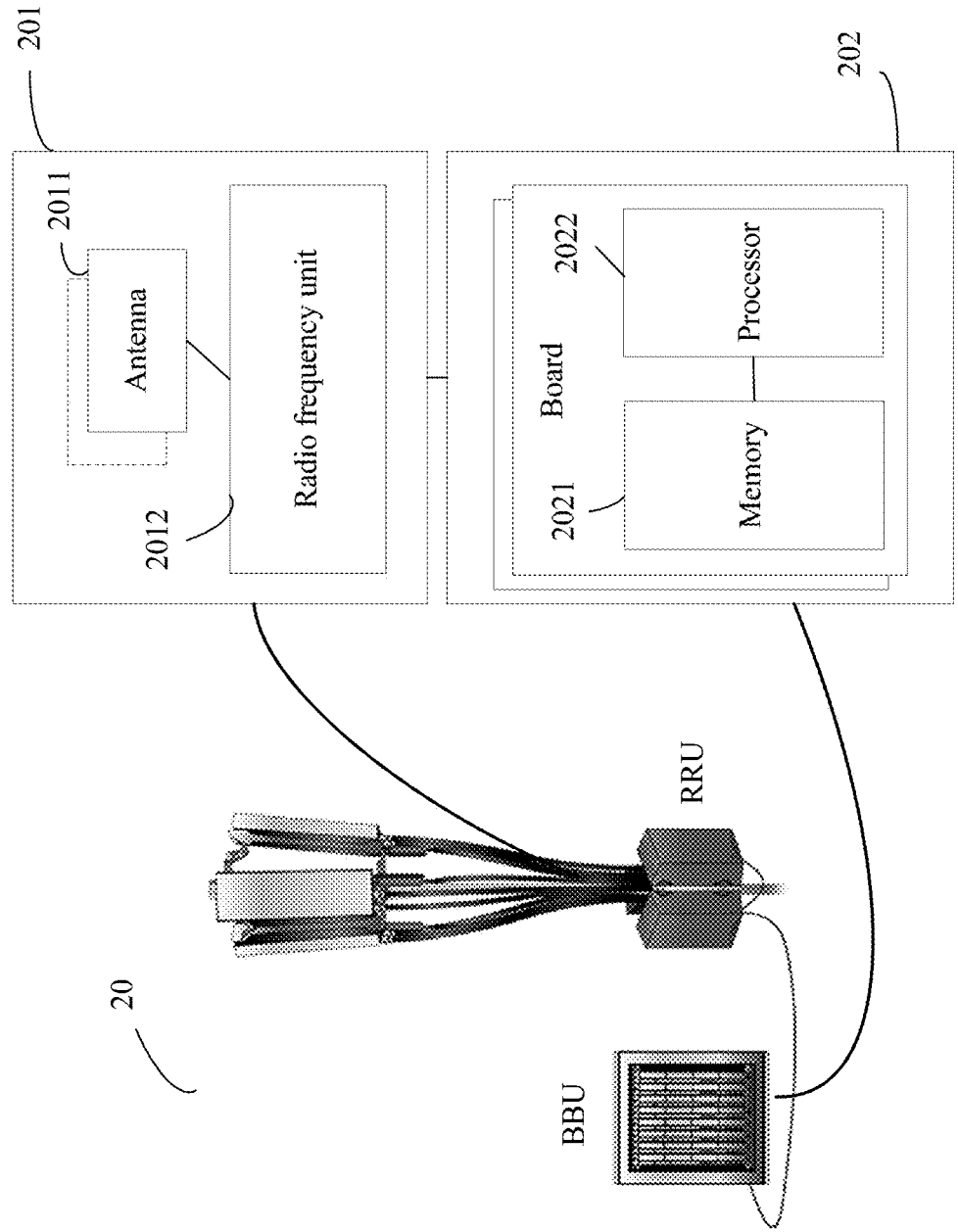
FIG. 10 is a schematic structural diagram of a base station according to an embodiment of the present invention.

FIG. 10 is a schematic structural diagram of a base station. The base station may be applied to the system shown in FIG. 1. The base station 20 includes one or more remote radio units (RRU) 201 and one or more baseband units (BBU) 202. The RRU 201 may be referred to as a transceiver unit, a transceiver, a transceiver circuit, or the like, and may include at least one antenna 2011 and a radio frequency unit 2012. The RRU 201 is mainly configured to: receive/send a radio frequency signal, and perform conversion between a radio frequency signal and a baseband signal, for example, configured to send a signaling indication and/or a reference signal in the foregoing embodiment to a terminal. The BBU 202 is mainly configured to: perform baseband processing, control the base station, and the like. The RRU 201 and the BBU 202 may be physically disposed together, or may be physically separated, namely, a distributed base station.

The BBU 202 is a control center of the base station, may also be referred to as a processing unit, and is mainly configured to implement a baseband processing function, such as channel coding, multiplexing, modulation, or spread spectrum. In an example, the BBU 202 may include one or more boards, and a plurality of boards may jointly support a radio access network (such as a 5G network) of a single access standard, or may separately support radio access networks of different access standards. The BBU 202 further includes a memory 2021 and a processor 2022. The memory 2021 is configured to store a necessary instruction and data. The processor 2022 is configured to control the base station to perform a necessary action. The memory 2021 and the processor 2022 may serve the one or more boards. In other words, a memory and a processor may be independently disposed on each board. Alternatively, a plurality of boards may use a same memory and processor. In addition, a necessary circuit is further disposed on each board.

The base station may be configured to implement the reference signal transmission method in the foregoing method embodiment, and details are as follows:

The processor is configured to map reference signals to at least one resource unit, where the at least one resource unit includes a plurality of sub-resource units.

The transceiver is configured to: send the reference signals, and receive, from the terminal, measurement information related to part of the sub-resource units.

Optionally, the transceiver is further configured to send configuration information of the reference signals to the terminal.

The base station may also be configured to implement the resource request method in the foregoing method embodiment, and details are as follows:

The transceiver is configured to receive a reference signal sending request from the terminal.

The processor is configured to obtain at least one of the following information from the reference signal sending request: a resource unit type, a resource unit size, a resource unit quantity, a reference signal mapping manner, and a resource unit sequence.

The base station may also be configured to implement the resource indication method in the foregoing method embodiment.

Figure 11:
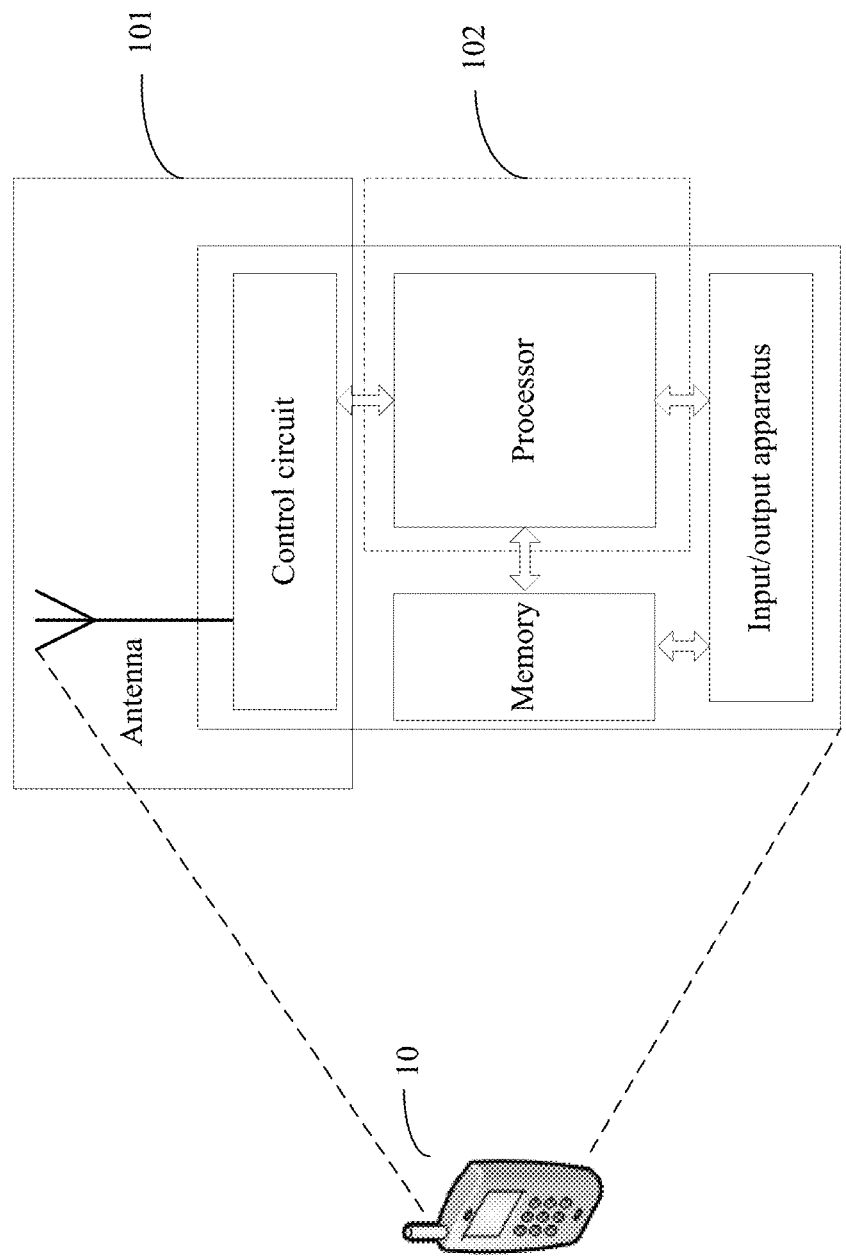
FIG. 11 is a schematic structural diagram of a terminal according to an embodiment of the present invention.

FIG. 11 is a schematic structural diagram of a terminal. The terminal may be applied to the system shown in FIG. 1. For ease of description, FIG. 11 shows only main components of the terminal. As shown in FIG. 11, the terminal 10 includes a processor, a memory, a control circuit, an antenna, and an input/output apparatus. The processor is mainly configured to: process a communications protocol and communication data, control the entire terminal, execute a software program, and process data of the software program. The memory is mainly configured to store a software program and data, for example, store a codebook described in the foregoing embodiment. The control circuit is mainly configured to: perform conversion between a baseband signal and a radio frequency signal, and process the radio frequency signal. A combination of the control circuit and the antenna may also be referred to as a transceiver that is mainly configured to receive/send a radio frequency signal in an electromagnetic wave form. The input/output apparatus, such as a touchscreen, a display screen, or a keyboard, is mainly configured to: receive data entered by a user, and output data to the user.

After the terminal is powered on, the processor may read the software program in the memory, explain and execute an instruction of the software program, and process the data of the software program. When data needs to be sent in a wireless manner, the processor performs baseband processing on the to-be-sent data, and then outputs a baseband signal to a radio frequency circuit. After performing radio frequency processing on the baseband signal, the radio frequency circuit sends a radio frequency signal in an electromagnetic wave form by using the antenna. When data is sent to the terminal, a radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that, for ease of description, FIG. 11 shows only one memory and one processor. Actually, the terminal may include a plurality of processors and memories. The memory may also be referred to as a storage medium, a storage device, or the like. This is not limited in this embodiment of the present invention.

In an optional implementation, the processor may include a baseband processor and a central processing unit. The baseband processor is mainly configured to process a communications protocol and communication data, and the central processing unit is mainly configured to: control the entire terminal, execute a software program, and process data of the software program. The processor in FIG. 11 is integrated with functions of the baseband processor and the central processing unit. A person skilled in the art may understand that, the baseband processor and the central processing unit may be independent processors, and are interconnected by using a technology such as a bus. A person skilled in the art may understand that, the terminal may include a plurality of baseband processors to adapt to different network standards, the terminal may include a plurality of central processing units to enhance a processing capability of the terminal, and all components of the terminal may be connected to each other by using various buses. The baseband processor may also be expressed as a baseband processing circuit or a baseband processing chip. The central processing unit may also be expressed as a central processing circuit or a central processing chip. A function of processing the communications protocol and the communication data may be embedded in the processor, or may be stored in the memory in a form of a software program, and the processor executes the software program to implement a baseband processing function.

For example, in this embodiment of the present invention, the antenna and the control circuit that have receiving and sending functions may be considered as a transceiver unit 101 of the terminal 10, and the processor having a processing function may be considered as a processing unit 102 of the terminal 10. As shown in FIG. 11, the terminal 10 includes the transceiver unit 101 and the processing unit 102. The transceiver unit may also be referred to as a transceiver, a transceiver, a transceiver apparatus, or the like. Optionally, a component that is in the transceiver unit 101 and that is configured to implement a receiving function may be considered as a receiving unit, and a component that is in the transceiver unit 101 and that is configured to implement a sending function may be considered as a sending unit, namely, the transceiver unit 101 includes the receiving unit and the sending unit. For example, the receiving unit may also be referred to as a receiver, a receiver, a receiver circuit, or the like, and the sending unit may be referred to as a transmitter, a transmitter, a transmitting circuit, or the like.

The terminal may be configured to implement the reference signal transmission method in the foregoing method embodiment, and details are as follows:

The transceiver is configured to: receive configuration information of reference signals from a network node, and receive, based on the configuration information, the reference signals mapped to at least one resource unit, where the at least one resource unit includes a plurality of sub-resource units.

The processor is configured to measure the received reference signals.

The transceiver is further configured to send measurement information related to part of the sub-resource units.

The terminal may also be configured to implement the resource request method in the foregoing method embodiment, and details are as follows:

The processor is configured to generate a reference signal sending request, where the reference signal sending request includes at least one of the following information: a resource unit type, a resource unit size, a resource unit quantity, a reference signal mapping manner, and a resource unit sequence.

The transceiver is configured to send the reference signal sending request to a network node.

The terminal may also be configured to implement the resource indication method in the foregoing method embodiment.

A person skilled in the art may further understand that various illustrative logical blocks and steps that are listed in the embodiments of the present invention may be implemented by using electronic hardware, computer software, or a combination thereof. Whether the functions are implemented by using hardware or software depends on particular applications and a design requirement of an entire system. For each particular application, a person skilled in the art may use various methods to implement the functions. However, it should not be considered that this implementation goes beyond the protection scope of the embodiments of the present invention.

The various illustrative logical units and circuits described in the embodiments of the present invention may implement or operate the described functions by using a general purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general purpose processor may be a microprocessor. Optionally, the general purpose processor may be any conventional processor, controller, microcontroller, or state machine. The processor may also be implemented by using a combination of computing apparatuses, such as a digital signal processor and a microprocessor, a plurality of microprocessors, one or more microprocessors with a digital signal processor core, or any other similar configuration.

Steps of the methods or algorithms described in the embodiments of the present invention may be directly embedded into hardware, a software unit executed by a processor, or a combination thereof. The software unit may be stored in a RAM, a flash memory, a ROM memory, an EPROM memory, an EEPROM memory, a register, a hard disk, a removable magnetic disk, a CD-ROM, or a storage medium of any other form in the art. For example, the storage medium may be connected to the processor, so that the processor may read information from the storage medium and write information into the storage medium.

Optionally, the storage medium may be integrated into the processor. The processor and the storage medium may be disposed in an ASIC, and the ASIC may be disposed in a UE. Optionally, the processor and the storage medium may be disposed in different components of the UE.

In one or more example designs, the functions described in the embodiments of the present invention may be implemented by using hardware, software, firmware, or any combination thereof. If the functions are implemented by using software, the functions may be stored in a computer readable medium or are transmitted to the computer readable medium in a form of one or more instructions or code. The computer readable medium includes a computer storage medium and a communications medium that enables a computer program to move from one place to another place. The storage medium may be an available medium that can be accessed by any general-purpose or special computer. For example, such a computer readable medium may include but is not limited to a RAM, a ROM, an EEPROM, a CD-ROM or another optical disc storage, a disk storage or another magnetic storage apparatus, or any other medium that may be used to bear or store program code, where the program code is in a form of an instruction or a data structure or in a form that can be read by a general-purpose or special computer or by a general-purpose or special processor. In addition, any connection may be appropriately defined as a computer readable medium. For example, if software is transmitted from a website, a server, or another remote resource by using a coaxial cable, an optical fiber, a twisted pair, a digital subscriber line (DSL) or in a wireless manner, such as infrared, radio, or microwave, the software is included in a defined computer readable medium. The disc include a compressed disk, a laser disk, an optical disc, a DVD, a floppy disk, and a Blu-ray disc. The disk generally copies data by a magnetic means, and the disc generally copies data optically by a laser means. The foregoing combination may also be included in the computer readable medium.

The foregoing descriptions of this specification in the present invention may enable a person skilled in the art to use or implement the content of the present invention. It should be considered that any modification made based on the disclosed content is obvious in the art. The basic principles described in the present invention may be applied to other variations without departing from the essence and scope of the present invention. Therefore, the content disclosed in the present invention is not limited to the described embodiments and designs, but may further be extended to a maximum scope that is consistent with the principles of the present invention and new features disclosed in the present invention.

What is claimed is:

1. A reference signal transmission method, comprising:
   sending, by a network node, configuration information of reference signals to a terminal device, wherein the configuration information includes information of a resource unit for transmitting the reference signals and a resource unit type, wherein the resource unit comprises a plurality of sub-resource units, and the resource unit type indicates that the reference signals mapped to the plurality of sub-resource units of the resource unit have a same transmitting beam;
   sending, by the network node, the reference signals by mapping the reference signals to the plurality of sub-resource units to the terminal device; and
   receiving, by the network node from the terminal device, measurement information related to part of the plurality of sub-resource units, wherein the measurement information comprises a measurement value that corresponds to the part of the plurality of sub-resource units.

2. The method according to claim 1, wherein the measurement value comprises a reference signal received power (RSRP).

3. The method according to claim 1, wherein the reference signals comprise channel state information-reference signals.

4. A reference signal transmission method, comprising:
   receiving, by a terminal device, configuration information of reference signals from a network node, wherein the configuration information includes information of a resource unit for transmitting the reference signals and a resource unit type, wherein the resource unit comprises a plurality of sub-resource units, and the resource unit type indicates that the reference signals mapped to the plurality of sub-resource units of the resource unit have a same transmitting beam;
   receiving and measuring, by the terminal device based on the configuration information, the reference signals mapped to the plurality of sub-resource units; and
   sending, by the terminal device to the network node, measurement information related to part of the plurality of sub-resource units, wherein the measurement information comprises a measurement value that corresponds to the part of the plurality of sub-resource units.

5. The method according to claim 4, wherein the measurement value comprises a reference signal received power (RSRP).

6. The method according to claim 4, wherein the reference signals comprise channel state information-reference signals.

7. A network node, comprising:
   a processor;
   a memory coupled to the processor, the memory comprising instructions that, when executed by the processor, cause the network node to:
   send configuration information of reference signals to a terminal device, wherein the configuration information includes information of a resource unit for transmitting the reference signals and a resource unit type, wherein the resource unit comprises a plurality of sub-resource units, and the resource unit type indicates that the reference signals mapped to the plurality of sub-resource units of the resource unit have a same transmitting beam;
   send the reference signals by mapping the reference signals to the plurality of sub-resource units to the terminal device; and
   receive, from the terminal device, measurement information related to part of the plurality of sub-resource units, wherein the measurement information comprises a measurement value that corresponds to the part of the plurality of sub-resource units.

8. The network node according to claim 7, wherein the measurement value comprises a reference signal received power (RSRP).

9. The network node according to claim 7, wherein the reference signals comprise channel state information-reference signals.

10. A terminal device, comprising:
    a processor;
    a memory coupled to the processor, the memory comprising instructions that, when executed by the processor, cause the terminal device to:

receive configuration information of reference signals from a network node, wherein the configuration information includes information of a resource unit for transmitting the reference signals and a resource unit type, wherein the resource unit comprises a plurality of sub-resource units, and the resource unit type indicates that the reference signals mapped to the plurality of sub-resource units of the resource unit have a same transmitting beam;

receive and measure, based on the configuration information, the reference signals mapped to the plurality of sub-resource units; and send measurement information related to part of the plurality of sub-resource units to the network node, wherein the measurement information comprises a measurement value that corresponds to the part of the plurality of sub-resource units.

11. The terminal device according to claim 10, wherein the measurement value comprises a reference signal received power (RSRP).

12. The terminal device according to claim 10, wherein the reference signals comprise channel state information-reference signals.

* * * * *